US012647338B2

(12) United States Patent
Lunardi et al.

(10) Patent No.: US 12,647,338 B2
(45) Date of Patent: Jun. 2, 2026

(54) TRANSFERRING EVENTS RELATED TO BEAM MEASUREMENTS

(71) Applicant: Telefonaktiebolaget LM Ericsson (publ), Stockholm (SE)

(72) Inventors: Luca Lunardi, Genoa (IT); Pablo Soldati, Solna (SE); Angelo Centonza, Torrenueva Costa (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 524 days.

(21) Appl. No.: 18/018,720

(22) PCT Filed: Aug. 5, 2021

(86) PCT No.: PCT/SE2021/050775
§ 371 (c)(1),
(2) Date: Jan. 30, 2023

(87) PCT Pub. No.: WO2022/031212
PCT Pub. Date: Feb. 10, 2022

(65) Prior Publication Data
US 2023/0308371 A1 Sep. 28, 2023

Related U.S. Application Data

(60) Provisional application No. 63/061,946, filed on Aug. 6, 2020.

(51) Int. Cl.
*H04W 4/00* (2018.01)
*H04L 43/0817* (2022.01)
*H04W 56/00* (2009.01)

(52) U.S. Cl.
CPC ..... *H04L 43/0817* (2013.01); *H04W 56/0015* (2013.01)

(58) Field of Classification Search
CPC ... H04L 43/0817; H04L 5/005; H04L 5/0007; H04W 56/0015; H04W 24/10;
(Continued)

(56) References Cited

U.S. PATENT DOCUMENTS

| | | | | |
|---|---|---|---|---|
| 11,050,469 B2 * | 6/2021 | Li | ........................ | H04B 7/0695 |
| 11,419,015 B2 * | 8/2022 | Da Silva | .............. | H04B 7/0619 |

(Continued)

FOREIGN PATENT DOCUMENTS

| | | | | |
|---|---|---|---|---|
| CA | 3035020 A1 * | 5/2019 | ........... | H04W 24/10 |
| EP | 3836724 A1 | 6/2021 | | |

(Continued)

OTHER PUBLICATIONS

International Search Report and Written Opinion of the International Searching Authority, PCT/SE2021/050775, mailed Nov. 10, 2021, 13 pages.

(Continued)

*Primary Examiner* — Phuongchau Ba Nguyen
(74) *Attorney, Agent, or Firm* — Sage Patent Group

(57) ABSTRACT

A first network node can operate in a communications network that includes a second network node. The first network node receives a message from the second network node. The message can include information associated with an event detected by a neighbor network node that is different than the first network node. The event can be related to channel measurements associated with the neighbor network node operating in the communications network. The first network node can determine a network issue associated with the communications network based on the information.

18 Claims, 31 Drawing Sheets

Transmit a measurement transfer request message to a second network node 3810

Receive a measurement transfer response message from the second network node 3820

Receive a message from the second network node, the message including information associated with an event related to channel measurements 3830

Determine a network issue associated with the communications network based on the information 3840

(58) Field of Classification Search

CPC ..... H04W 24/04; H04W 16/28; H04W 92/20; H04W 28/04; H04W 72/04; H04W 72/042; H04W 88/08; H04W 28/08; H04W 28/084; H04W 36/22; H04W 72/12; H04B 7/022; H04B 7/0617

See application file for complete search history.

(56) References Cited

U.S. PATENT DOCUMENTS

| | | | | |
|---|---|---|---|---|
| 12,231,914 | B2 * | 2/2025 | Li | H04W 72/542 |
| 2013/0223251 | A1 * | 8/2013 | Li | H04B 7/0689 |
| | | | | 370/252 |
| 2021/0185736 | A1 | 6/2021 | Shi et al. | |
| 2021/0288696 | A1 * | 9/2021 | Jung | H04B 7/0421 |
| 2021/0306895 | A1 * | 9/2021 | Chen | G01S 5/0236 |
| 2021/0409967 | A1 * | 12/2021 | Franke | H04W 16/28 |
| 2021/0410097 | A1 * | 12/2021 | Munier | H04L 1/0067 |
| 2022/0150881 | A1 * | 5/2022 | Agiwal | H04W 74/0833 |
| 2023/0232402 | A1 * | 7/2023 | Zhang | H04L 1/0026 |
| | | | | 370/329 |

FOREIGN PATENT DOCUMENTS

| | | | | | |
|---|---|---|---|---|---|
| EP | | 3665947 | B1 * | 10/2021 | H04W 36/304 |
| WO | | 2020042962 | A1 | 3/2020 | |
| WO | | 2020145787 | A1 | 7/2020 | |
| WO | | 2022031208 | A1 | 2/2022 | |

OTHER PUBLICATIONS

Ericsson, 3GPP TSG-RAN3 #107bis-e, R3-202266, "Solution for RACH Conflict Detection and Resolution at aNB-DU," Online, Apr. 20-30, 2020, 96 pages.

Ericsson, 3GPP TSG-RAN WG3 #104, R3-193066, "TP to TR 37.816 on Coverage and Capacity Optimisation Solution for NR," Reno, Nevada, US, May 13-17, 2019, 4 pages.

Intel et al., 3GPP TSG SA WG5 (Telecom Management) Meeting #125, S5-193115, "pCR 28.861 add use case for beam optimisation in CCO," Newport Beach, California, USA, Apr. 8-12, 2019, 2 pages.

Ericsson, 3GPP TSG-RAN WG3 Meeting #110-e, R3-206514, "(TP for SON BL CR for TS 38.423, TS 38.473, TS 38.300): CCO," Online, Nov. 2-12, 2020, 41 pages.

3GPP TS 38.401 v15.4.0 (Dec. 2018), 3rd Generation Partnership Project; Technical Specification Group Radio Access Network; NG-RAN; Architecture description (Release 15), 40 pages.

3GPP TS 38.331 v16.0.0 (Mar. 2020), 3rd Generation Partnership Project; Technical Specification Group Radio Access Network; NR; Radio Resource Control (RRC) protocol specification (Release 16), 835 pages.

3GPP TS 38.214 v16.0.0 (Dec. 2019), 3rd Generation Partnership Project; Technical Specification Group Radio Access Network; NR; Physical layer procedures for data (Release 16), 147 pages.

3GPP TS 38.213 v16.0.0 (Dec. 2019), 3rd Generation Partnership Project; Technical Specification Group Radio Access Network; NR; Physical layer procedures for control (Release 16); 146 pages.

3GPP TS 38.211 v16.0.0 (Dec. 2019), 3rd Generation Partnership Project; Technical Specification Group Radio Access Network; NR; Physical channels and modulation (Release 16), 129 pages.

3GPP TS 38.133 v16.2.0 (Dec. 2019), 3rd Generation Partnership Project; Technical Specification Group Radio Access Network; NR; Requirements for support of radio resource management (Release 16), 1119 pages.

3GPP TS 38.215 v16.0.0 (Dec. 2019), 3rd Generation Partnership Project; Technical Specification Group Radio Access Network; NR; Physical layer requirements (Release 16), 21 pages.

3GPP TS 37.213 v16.0.0 (Dec. 2019), 3rd Generation Partnership Project; Technical Specification Group Radio Access Network; Physical layer procedures for shared spectrum channel access (Release 16), 25 pages.

3GPP TS 38.321 v16.0.0 (Dec. 2019), 3rd Generation Partnership Project; Technical Specification Group Radio Access Network; NR; Medium Access Control (MAC) protocol specification (Release 16), 141 pages.

3GPP TS 38.101-1 v16.2.0 (Dec. 2019), 3rd Generation Partnership Project; Technical Specification Group Radio Access Network; NR; User Equipment (UE) radio transmission and reception; Part 1: Range 1 Standalone (Release 16), 310 pages.

3GPP TS 38.101-2 v16.2.0 (Dec. 2019), 3rd Generation Partnership Project; Technical Specification Group Radio Access Network; NR; User Equipment (UE) radio transmission and reception; Part 2: Range 2 Standalone (Release 16), 157 pages.

Office Action for Indian Patent Application No. 202317004540 mailed Apr. 2, 2024, 7 pages.

Ericsson, "TP to TR 37.816 on Coverage and Capacity Optimisation Solution for NR," 3GPP TSG-RAN WG3 #104, Reno, Nevada, US, May 13-May 17, 2019, R3-193246, R3-193066, 5 pages.

* cited by examiner

```
-- ASN1START
-- TAG-SSB-INDEX-START

SSB-Index ::=                            INTEGER (0..maxNrofSSBs-1)

-- TAG-SSB-INDEX-STOP
-- ASN1STOP
```

FIG. 3

```
-- ASN1START
-- TAG-SSB-MTC-START

SSB-MTC ::=                          SEQUENCE {
    periodicityAndOffset                 CHOICE {
        sf5                              INTEGER (0..4),
        sf10                             INTEGER (0..9),
        sf20                             INTEGER (0..19),
        sf40                             INTEGER (0..39),
        sf80                             INTEGER (0..79),
        sf160                            INTEGER (0..159)
    },
    duration                         ENUMERATED { sf1, sf2, sf3, sf4, sf5 }
}

SSB-MTC2 ::=                         SEQUENCE {
    pci-List                             SEQUENCE (SIZE (1..maxNrofPCIsPerSMTC)) OF PhysCellId
OPTIONAL,   -- Need M
    periodicity                      ENUMERATED {sf5, sf10, sf20, sf40, sf80, spare3,
spare2, spare1}
}

SSB-MTC2-LP-r16 ::=                  SEQUENCE {
    pci-List                             SEQUENCE (SIZE (1..maxNrofPCIsPerSMTC)) OF PhysCellId
OPTIONAL,   -- Need R
    periodicity                      ENUMERATED {sf10, sf20, sf40, sf80, sf160, spare3,
spare2, spare1}
}

SSB-MTC3-r16 ::=                     SEQUENCE {
        ssb-MTC-Periodicity-r16          ENUMERATED {ms5, ms10, ms20, ms40, ms80, ms160, ms320,
ms640, ms1280},
        ssb-MTC-Timingoffset-r16         INTEGER (0..127),
        ssb-MTC-Duration-r16             ENUMERATED {sf1, sf2, sf3, sf4, sf5},
        ssb-MTC-pci-List-r16             SEQUENCE (SIZE (0..63)) OF PhysCellId,
        ssb-ToMeasure-r16                SetupRelease { SSB-ToMeasure }
OPTIONAL   -- Need M
    }

-- TAG-SSB-MTC-STOP
-- ASN1STOP
```

FIG. 4

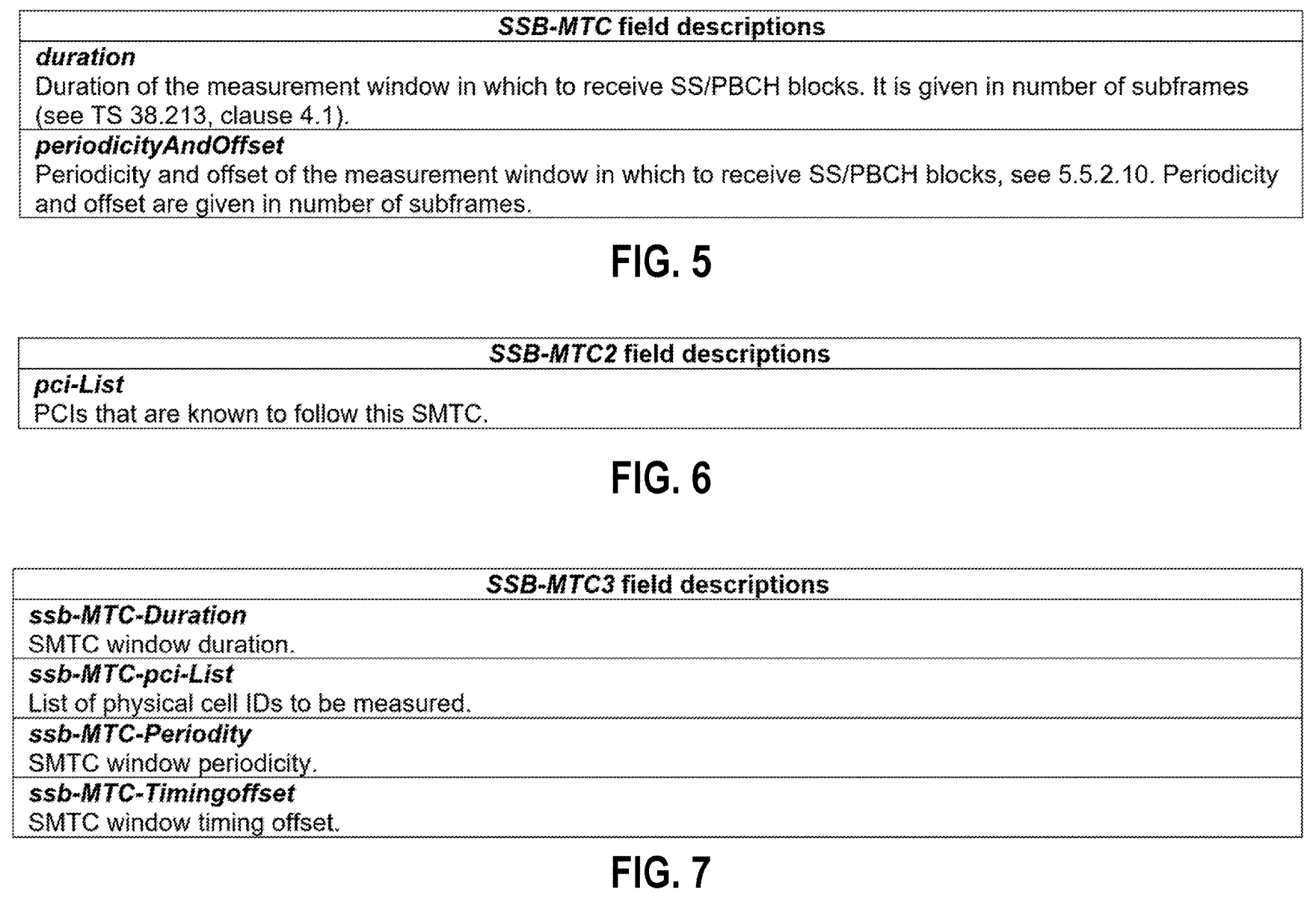

| *SSB-MTC* field descriptions |
|---|
| *duration* |
| Duration of the measurement window in which to receive SS/PBCH blocks. It is given in number of subframes (see TS 38.213, clause 4.1). |
| *periodicityAndOffset* |
| Periodicity and offset of the measurement window in which to receive SS/PBCH blocks, see 5.5.2.10. Periodicity and offset are given in number of subframes. |

FIG. 5

| *SSB-MTC2* field descriptions |
|---|
| *pci-List* |
| PCIs that are known to follow this SMTC. |

FIG. 6

| *SSB-MTC3* field descriptions |
|---|
| *ssb-MTC-Duration* |
| SMTC window duration. |
| *ssb-MTC-pci-List* |
| List of physical cell IDs to be measured. |
| *ssb-MTC-Periodity* |
| SMTC window periodicity. |
| *ssb-MTC-Timingoffset* |
| SMTC window timing offset. |

FIG. 7

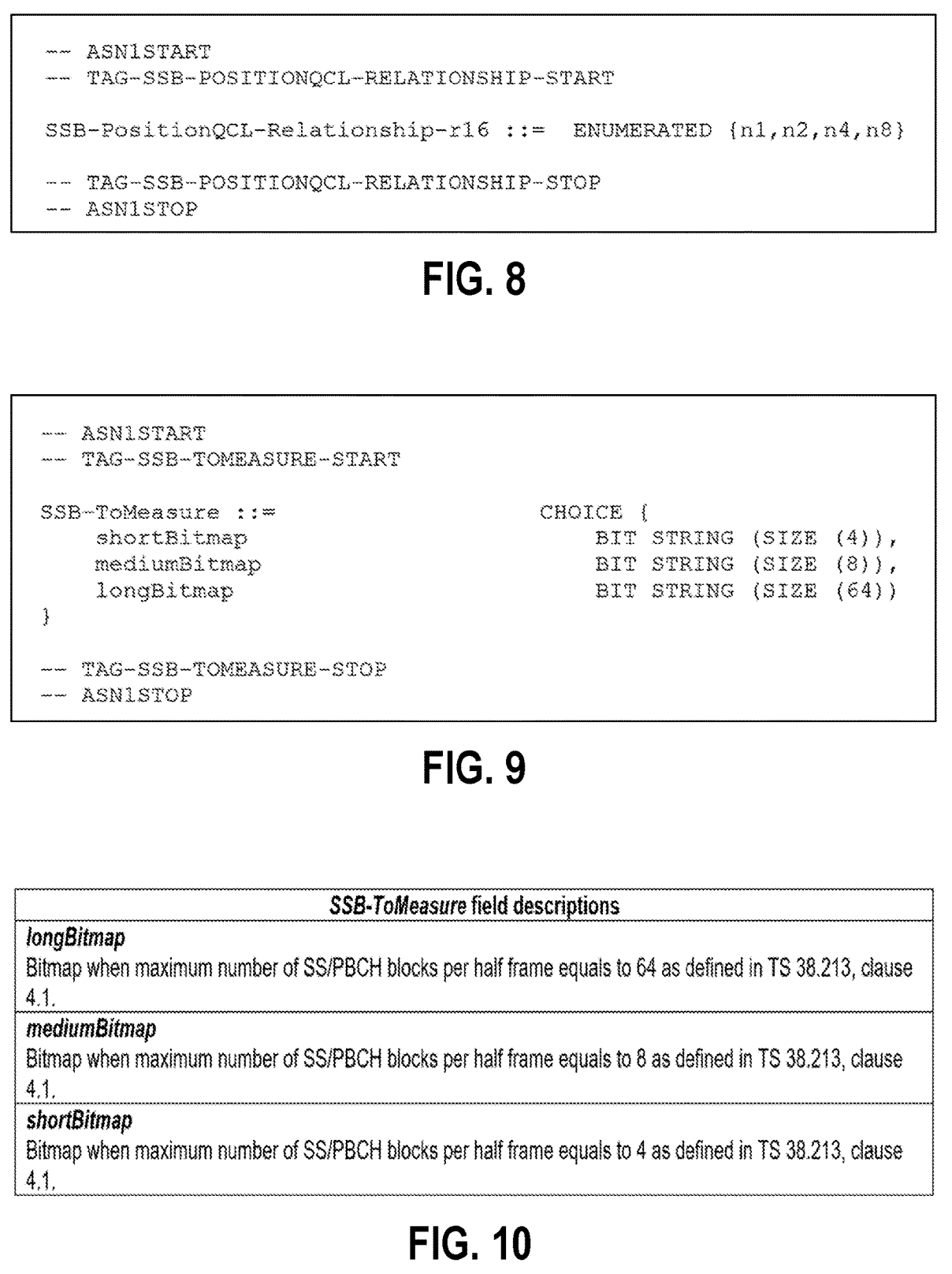

```
-- ASN1START
-- TAG-SSB-POSITIONQCL-RELATIONSHIP-START

SSB-PositionQCL-Relationship-r16 ::=   ENUMERATED {n1,n2,n4,n8}

-- TAG-SSB-POSITIONQCL-RELATIONSHIP-STOP
-- ASN1STOP
```

FIG. 8

```
-- ASN1START
-- TAG-SSB-TOMEASURE-START

SSB-ToMeasure ::=                    CHOICE {
    shortBitmap                          BIT STRING (SIZE (4)),
    mediumBitmap                         BIT STRING (SIZE (8)),
    longBitmap                           BIT STRING (SIZE (64))
}

-- TAG-SSB-TOMEASURE-STOP
-- ASN1STOP
```

FIG. 9

| *SSB-ToMeasure* field descriptions |
| --- |
| *longBitmap* |
| Bitmap when maximum number of SS/PBCH blocks per half frame equals to 64 as defined in TS 38.213, clause 4.1. |
| *mediumBitmap* |
| Bitmap when maximum number of SS/PBCH blocks per half frame equals to 8 as defined in TS 38.213, clause 4.1. |
| *shortBitmap* |
| Bitmap when maximum number of SS/PBCH blocks per half frame equals to 4 as defined in TS 38.213, clause 4.1. |

FIG. 10

```
-- ASN1START
-- TAG-NZP-CSI-RS-RESOURCE-START

NZP-CSI-RS-Resource ::=              SEQUENCE {
    nzp-CSI-RS-ResourceId            NZP-CSI-RS-ResourceId,
    resourceMapping                  CSI-RS-ResourceMapping,
    powerControlOffset               INTEGER (-8..15),
    powerControlOffsetSS             ENUMERATED{db-3, db0, db3, db6}   OPTIONAL,    -- Need R
    scramblingID                     ScramblingId,
    periodicityAndOffset             CSI-ResourcePeriodicityAndOffset  OPTIONAL,    -- Cond
PeriodicOrSemiPersistent
    qcl-InfoPeriodicCSI-RS                   TCI-StateId        OPTIONAL,    -- Cond Periodic
    ...
}

-- TAG-NZP-CSI-RS-RESOURCE-STOP
-- ASN1STOP
```

FIG. 11

| NZP-CSI-RS-Resource field descriptions |
|---|
| *periodicityAndOffset*<br>Periodicity and slot offset *sl1* corresponds to a periodicity of 1 slot, *sl2* to a periodicity of two slots, and so on. The corresponding offset is also given in number of slots (see TS 38.214, clause 5.2.2.3.1). Network always configures the UE with a value for this field for periodic and semi-persistent NZP-CSI-RS-Resource (as indicated in *CSI-ResourceConfig*). |
| *powerControlOffset*<br>Power offset of PDSCH RE to NZP CSI-RS RE. Value in dB (see TS 38.214, clauses 5.2.2.3.1 and 4.1). |
| *powerControlOffsetSS*<br>Power offset of NZP CSI-RS RE to SSS RE. Value in dB (see TS 38.214, clause 5.2.2.3.1). |
| *qcl-InfoPeriodicCSI-RS*<br>For a target periodic CSI-RS, contains a reference to one *TCI-State* in TCI-States for providing the QCL source and QCL type. For periodic CSI-RS, the source can be SSB or another periodic-CSI-RS. Refers to the *TCI-State* which has this value for *tci-StateId* and is defined in *tci-StatesToAddModList* in the *PDSCH-Config* included in the *BWP-Downlink* corresponding to the serving cell and to the DL BWP to which the resource belongs to (see TS 38.214, clause 5.2.2.3.1). |
| *resourceMapping*<br>OFDM symbol location(s) in a slot and subcarrier occupancy in a PRB of the CSI-RS resource. |
| *scramblingID*<br>Scrambling ID (see TS 38.214, clause 5.2.2.3.1). |

FIG. 12

| Conditional Presence | Explanation |
|---|---|
| *Periodic* | The field is optionally present, Need M, for periodic *NZP-CSI-RS-Resources* (as indicated in *CSI-ResourceConfig*). The field is absent otherwise. |
| *PeriodicOrSemiPersistent* | The field is optionally present, Need M, for periodic and semi-persistent *NZP-CSI-RS-Resources* (as indicated in *CSI-ResourceConfig*). The field is absent otherwise. |

FIG. 13

```
-- ASN1START
-- TAG-NZP-CSI-RS-RESOURCEID-START

NZP-CSI-RS-ResourceId ::=              INTEGER (0..maxNrofNZP-CSI-RS-Resources-1)

-- TAG-NZP-CSI-RS-RESOURCEID-STOP
-- ASN1STOP
```

FIG. 14

```
-- ASN1START
-- TAG-NZP-CSI-RS-RESOURCESET-START
NZP-CSI-RS-ResourceSet ::=          SEQUENCE {
    nzp-CSI-ResourceSetId               NZP-CSI-RS-ResourceSetId,
    nzp-CSI-RS-Resources                SEQUENCE (SIZE (1..maxNrofNZP-CSI-RS-ResourcesPerSet))
OF NZP-CSI-RS-ResourceId,
    repetition                          ENUMERATED { on, off }      OPTIONAL,    -- Need S
    aperiodicTriggeringOffset           INTEGER(0..6)               OPTIONAL,    -- Need S
    trs-Info                            ENUMERATED {true}           OPTIONAL,    -- Need R
    ...,
    [[
    aperiodicTriggeringOffsetExt-r16    INTEGER(0..31)              OPTIONAL     -- Need S
    ]]
}

-- TAG-NZP-CSI-RS-RESOURCESET-STOP
-- ASN1STOP
```

FIG. 15

| NZP-CSI-RS-ResourceSet field descriptions |
|---|
| aperiodicTriggeringOffset, aperiodicTriggeringOffsetExt |
| Offset X between the slot containing the DCI that triggers a set of aperiodic NZP CSI-RS resources and the slot in which the CSI-RS resource set is transmitted. For *aperiodicTriggeringOffset*, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For *aperiodicTriggeringOffsetExt*, the value indicates the number of slots. The network configures only one of the fields. When neither field is included, the UE applies the value 0. |
| nzp-CSI-RS-Resources |
| NZP-CSI-RS-Resources associated with this NZP-CSI-RS resource set (see TS 38.214, clause 5.2). For CSI, there are at most 8 NZP CSI RS resources per resource set. |
| repetition |
| Indicates whether repetition is on/off. If the field is set to *off* or if the field is absent, the UE may not assume that the NZP-CSI-RS resources within the resource set are transmitted with the same downlink spatial domain transmission filter (see TS 38.21, clauses 5.2.2.3.1 and 5.1.6.1.2). Can only be configured for CSI-RS resource sets which are associated with *CSI-ReportConfig* with report of L1 RSRP or "no report". |
| trs-Info |
| Indicates that the antenna port for all NZP-CSI-RS resources in the CSI-RS resource set is same. If the field is absent or released the UE applies the value *false* (see TS 38.214, clause 5.2.2.3.1). |

FIG. 16

```
--- ASN1START
--- TAG-NZP-CSI-RS-RESOURCESETID-START

NZP-CSI-RS-ResourceSetId ::=        INTEGER (0..maxNrofNZP-CSI-RS-ResourceSets-1)

-- TAG-NZP-CSI-RS-RESOURCESETID-STOP
--- ASN1STOP
```

FIG. 17

```
-- ASN1START
-- TAG-CSI-RS-RESOURCECONFIGMOBILITY-START

CSI-RS-ResourceConfigMobility::=        SEQUENCE {
        subcarrierSpacing                       SubcarrierSpacing,
        csi-RS-CellList-Mobility                SEQUENCE (SIZE (1..maxNrofCSI-RS-CellsRRM)) OF
CSI-RS-CellMobility,
        ...,
        [[
        refServCellIndex                        ServCellIndex       OPTIONAL     -- Need S
        ]]
}

CSI-RS-CellMobility::=                                   SEQUENCE {
        cellId                                          PhysCellId,
        csi-rs-MeasurementBW                    SEQUENCE {
                nrofPRBs                        ENUMERATED { size24, size48, size96, size192, size264},
                startPRB          |             NTEGER (0..2169)
        },
        density                                 ENUMERATED {d1, d3}         OPTIONAL,     -- Need R
        csi-rs-ResourceList-Mobility            SEQUENCE (SIZE (1..maxNrofCSI-RS-ResourcesRRM)) OF
CSI-RS-Resource-Mobility
}

CSI-RS-Resource-Mobility ::=            SEQUENCE {
        csi-RS-Index                                    CSI-RS-index,
        slotConfig                                      CHOICE {
                ms4                                             INTEGER (0..31),
                ms5                                             INTEGER (0..39),
                ms10                                            INTEGER (0..79),
                ms20                                            INTEGER (0..159),
                ms40                                            INTEGER (0..319)
        },
        associatedSSB                                   SEQUENCE {
                ssb-Index                                       SSB-Index,
                isQuasiColocated                                BOOLEAN
        }
OPTIONAL,     -- Need R
        frequencyDomainAllocation               CHOICE {
                row1                                            BIT STRING (SIZE (4)),
                row2                                            BIT STRING (SIZE (12))
        },
        firstOFDMSymbolInTimeDomain             INTEGER (0..13),
        sequenceGenerationConfig                INTEGER (0..1023),
        ...
}

CSI-RS-Index ::=                        INTEGER (0..maxNrofCSI-RS-ResourcesRRM-1)

-- TAG-CSI-RS-RESOURCECONFIGMOBILITY-STOP
-- ASN1STOP
```

FIG. 18

| *CSI-RS-CellMobility* field descriptions |
|---|
| *csi-rs-ResourceList-Mobility* |
| List of CSI-RS resources for mobility. The maximum number of CSI-RS resources that can be configured per *measObjectNR* depends on the configuration of *associatedSSB* (see TS 38.214 [19], clause 5.1.6.1.3). |
| *density* |
| Frequency domain density for the 1-port CSI-RS for L3 mobility. See TS 38.211 [16], clause 7.4.1. |
| *nrofPRBs* |
| Allowed size of the measurement BW in PRBs. See TS 38.211 [16], clause 7.4.1. |
| *startPRB* |
| Starting PRB index of the measurement bandwidth. See TS 38.211 [16], clause 7.4.1. |

FIG. 19

| *CSI-RS-ResourceConfigMobility* field descriptions |
|---|
| *csi-RS-CellList-Mobility* |
| List of cells for CSI-RS based RRM measurements. |
| *refServCellIndex* |
| Indicates the serving cell providing the timing reference for CSI-RS resources without *associatedSSB*. The field may be present only if there is at least one CSI-RS resource configured without *associatedSSB*. If this field is absent, the UE shall use the timing of the PCell for measurements on the CSI-RS resources without *associatedSSB*. The CSI-RS resources and the serving cell indicated by *refServCellIndex* for timing reference should be located in the same band. |
| *subcarrierSpacing* |
| Subcarrier spacing of CSI-RS. Only the values 15, 30 kHz or 60 kHz (FR1), and 60 or 120 kHz (FR2) are applicable. |

FIG. 20

```
NR-RS-Type ::=                              ENUMERATED (ssb, csi-rs)
```

FIG. 21

```
--ASN1START
--TAG-MEASOBJECTNR-START

MeasObjectNR ::=  SEQUENCE {
  ssbFrequency  ARFCN-ValueNR  OPTIONAL,  -- Cond SSBorAssociatedSSB
  ssbSubcarrierSpacing  SubcarrierSpacing  OPTIONAL,  -- Cond SSBorAssociatedSSB
  smtc1  SSB-MTC  OPTIONAL,  -- Cond SSBorAssociatedSSB
  smtc2  SSB-MTC2  OPTIONAL,  -- Cond IntraFreqConnected
  refFreqCSI-RS  ARFCN-ValueNR  OPTIONAL,  -- Cond CSI-RS
  referenceSignalConfig  ReferenceSignalConfig,
  absThreshSS-BlocksConsolidation  ThresholdNR  OPTIONAL, -- Need R
  absThreshCSI-RS-Consolidation  ThresholdNR  OPTIONAL, -- Need R
  nrofSS-BlocksToAverage  INTEGER (2..maxNrofSS-BlocksToAverage)  OPTIONAL, -- Need R
  nrofCSI-RS-ResourcesToAverage  INTEGER (2..maxNrofCSI-RS-ResourcesToAverage)  OPTIONAL, --
Need R
  quantityConfigIndex  INTEGER (1..maxNrofQuantityConfig),
  offsetMO  Q-OffsetRangeList,
  cellsToRemoveList  PCI-List  OPTIONAL, -- Need N
  cellsToAddModList  CellsToAddModList  OPTIONAL, -- Need N
  blackCellsToRemoveList  PCI-RangeIndexList  OPTIONAL, -- Need N
  blackCellsToAddModList  SEQUENCE (SIZE (1..maxNrofPCI-Ranges)) OF PCI-RangeElement
OPTIONAL, -- Need N
  whiteCellsToRemoveList  PCI-RangeIndexList  OPTIONAL, -- Need N
  whiteCellsToAddModList  SEQUENCE (SIZE (1..maxNrofPCI-Ranges)) OF PCI-RangeElement
OPTIONAL, -- Need N ...,
  [[
  freqBandIndicatorNR  FreqBandIndicatorNR  OPTIONAL, -- Need R
  measCyclesCell  ENUMERATED {sf160, sf256, sf320, sf512, sf640, sf1024, sf1280} OPTIONAL, -- Need
R
  ]],
  [[
  smtc3list-r16  SSB-MTC3List-r16  OPTIONAL,  -- Cond FFS
  rmtc-Config-r16  SetupRelease {RMTC-Config-r16}  OPTIONAL, -- Need M
  ssb-PositionQCL-Common-r16  SSB-PositionQCL-Relationship-r16  OPTIONAL, -- Need M
  ssb-PositionQCL-CellsToAddModList-r16  SSB-PositionQCL-CellsToAddModList-r16  OPTIONAL, --
Need N
  ssb-PositionQCL-CellsToRemoveList-r16  PCI-List  OPTIONAL, -- Need N
  t312-r16  SetupRelease { T312-r16 } OPTIONAL -- Need M
  ]]
}

SSB-MTC3List-r16::=  SEQUENCE (SIZE (1..4)) OF SSB-MTC3-r16

T312-r16::=  ENUMERATED { ms0, ms50, ms100, ms200, ms300, ms400, ms500, ms1000}

ReferenceSignalConfig::=  SEQUENCE {
  ssb-ConfigMobility  SSB-ConfigMobility  OPTIONAL, -- Need M
  csi-rs-ResourceConfigMobility  SetupRelease { CSI-RS-ResourceConfigMobility } OPTIONAL -- Need M
}
```

FIG. 22

```
SSB-ConfigMobility::=  SEQUENCE {
   ssb-ToMeasure   SetupRelease { SSB-ToMeasure }   OPTIONAL, -- Need M
   deriveSSB-IndexFromCell  BOOLEAN,
   ss-RSSI-Measurement  SS-RSSI-Measurement  OPTIONAL -- Need M
}
Q-OffsetRangeList ::=  SEQUENCE {
   rsrpOffsetSSB  Q-OffsetRange  DEFAULT dB0,
   rsrqOffsetSSB  Q-OffsetRange  DEFAULT dB0,
   sinrOffsetSSB  Q-OffsetRange  DEFAULT dB0,
   rsrpOffsetCSI-RS  Q-OffsetRange  DEFAULT dB0,
   rsrqOffsetCSI-RS  Q-OffsetRange  DEFAULT dB0,
   sinrOffsetCSI-RS  Q-OffsetRange  DEFAULT dB0
}
ThresholdNR ::=  SEQUENCE {
   thresholdRSRP  RSRP-Range  OPTIONAL, -- Need R
   thresholdRSRQ  RSRQ-Range  OPTIONAL, -- Need R
   thresholdSINR  SINR-Range  OPTIONAL -- Need R
}
CellsToAddModList::=  SEQUENCE (SIZE (1..maxNrofCellMeas)) OF CellsToAddMod CellsToAddMod ::=  SEQUENCE {
   physCellId  PhysCellId,
   cellIndividualOffset  Q-OffsetRangeList
}
RMTC-Config-r16 ::=  SEQUENCE {
   rmtc-Periodicity-r16  ENUMERATED {ms40, ms80, ms160, ms320, ms640},
   rmtc-SubframeOffset-r16  INTEGER (0..639)  OPTIONAL, -- Need M
   measDuration-r16  ENUMERATED {sym1, sym14, sym28, sym42, sym70},
   rmtc-MeasARFCN-r16  ARFCN-ValueNR,
   ...
}
SSB-PositionQCL-CellsToAddModList-r16 ::=  SEQUENCE (SIZE (1..maxNrofCellMeas)) OF SSB-Position
QCL-CellsToAdd-r16

SSB-PositionQCL-CellsToAdd-r16::=  SEQUENCE {
   physCellId-r16  PhysCellId,
   ssb-PositionQCL-r16  SSB-PositionQCL-Relationship-r16
}
-- TAG-MEASOBJECTNR-STOP
-- ASN1STOP
```

FIG. 22 (Cont.)

| *CellsToAddMod* field descriptions |
|---|
| *cellIndividualOffset* |
| Cell individual offsets applicable to a specific cell. |
| *physCellId* |
| Physical cell identity of a cell in the cell list. |

FIG. 23

| *MeasObjectNR* field descriptions |
|---|
| absThreshCSI-RS-Consolidation |
| Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2. |
| absThreshSS-BlocksConsolidation |
| Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2. |
| blackCellsToAddModList |
| List of cells to add/modify in the black list of cells. It applies only to SSB resources. |
| blackCellsToRemoveList |
| List of cells to remove from the black list of cells. |
| cellsToAddModList |
| List of cells to add/modify in the cell list. |
| cellsToRemoveList |
| List of cells to remove from the cell list. |
| freqBandIndicatorNR |
| The frequency band in which the SSB and/or CSI-RS indicated in this *MeasObjectNR* are located and according to which the UE shall perform the RRM measurements. This field is always provided when the network configures measurements with this *MeasObjectNR*. |
| measCycleSCell |
| The parameter is used only when an SCell is configured on the frequency indicated by the measObjectNR and is in deactivated state, see TS 38.133 [14]. gNB configures the parameter whenever an SCell is configured on the frequency indicated by the *measObjectNR*, but the field may also be signalled when an SCell is not configured. Value *sf160* corresponds to 160 sub-frames, value *sf256* corresponds to 256 sub-frames and so on. |
| nrofCSInrofCSI-RS-ResourcesToAverage |
| Indicates the maximum number of measurement results per beam based on CSI-RS resources to be averaged. The same value applies for each detected cell associated with this *MeasObjectNR*. |
| nrofSS-BlocksToAverage |
| Indicates the maximum number of measurement results per beam based on SS/PBCH blocks to be averaged. The same value applies for each detected cell associated with this *MeasObject*. |
| offsetMO |
| Offset values applicable to all measured cells with reference signal(s) indicated in this *MeasObjectNR*. |
| quantityConfigIndex |
| Indicates the *n-th* element of *quantityConfigNR-List* provided in *MeasConfig*. |
| referenceSignalConfig |
| RS configuration for SS/PBCH block and CSI-RS. |
| refFreqCSI-RS |
| Point A which is used for mapping of CSI-RS to physical resources according to TS 38.211 [16] clause 7.4.1.5.3. |
| smtc1 |
| Primary measurement timing configuration. (see clause 5.5.2.10). |
| smtc2 |
| Secondary measurement timing configuration for SS corresponding to this *MeasObjectNR* with PCI listed in *pci-List*. For these SS, the periodicity is indicated by *periodicity* in *smtc2* and the timing offset is equal to the offset indicated in *periodicityAndOffset* modulo *periodicity*. *periodicity* in smtc2 can only be set to a value strictly shorter than the periodicity indicated by *periodicityAndOffset* in *smtc1* (e.g. if *periodicityAndOffset* indicates *sf10*, *periodicity* can only be set of *sf5*, if *periodicityAndOffset* indicates *sf5*, *smtc2* cannot be configured). |
| smtc3list-v16xy |
| Measurement timing configuration list for SS corresponding to IAB-MT. |
| ssbFrequency |
| Indicates the frequency of the SS associated to this *MeasObjectNR*. |
| ssbSubcarrierSpacing |
| Subcarrier spacing of SSB. Only the values 15 kHz or 30 kHz (FR1), and 120 kHz or 240 kHz (FR2) are applicable. |
| t312 |
| The value of timer T312. Value ms0 represents 0 ms, ms50 represents 50 ms and so on. |
| whiteCellsToAddModList |
| List of cells to add/modify in the white list of cells. It applies only to SSB resources. |
| whiteCellsToRemoveList |
| List of cells to remove from the white list of cells. |

FIG. 24

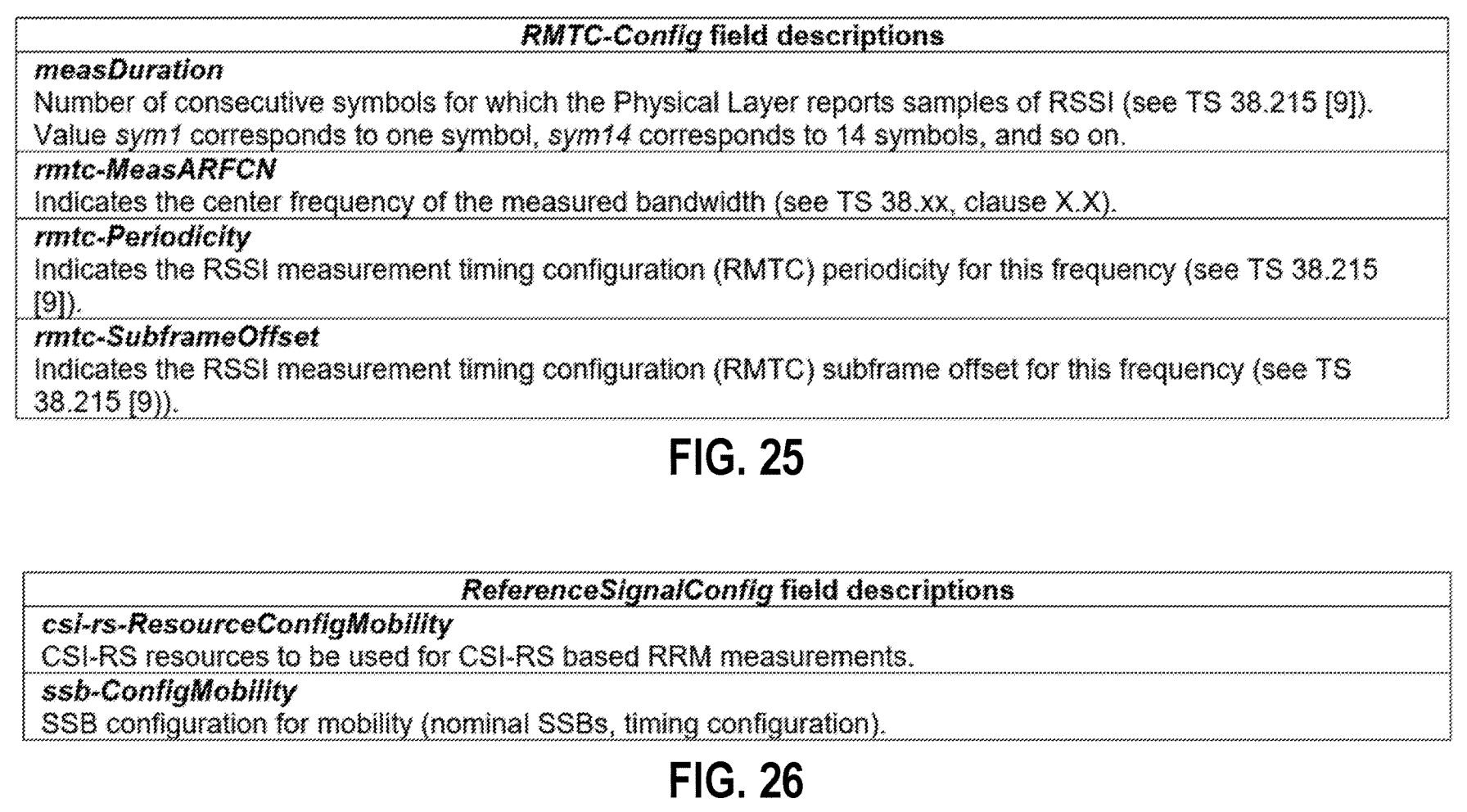

RMTC-Config field descriptions

*measDuration*
Number of consecutive symbols for which the Physical Layer reports samples of RSSI (see TS 38.215 [9]).
Value *sym1* corresponds to one symbol, *sym14* corresponds to 14 symbols, and so on.

*rmtc-MeasARFCN*
Indicates the center frequency of the measured bandwidth (see TS 38.xx, clause X.X).

*rmtc-Periodicity*
Indicates the RSSI measurement timing configuration (RMTC) periodicity for this frequency (see TS 38.215 [9]).

*rmtc-SubframeOffset*
Indicates the RSSI measurement timing configuration (RMTC) subframe offset for this frequency (see TS 38.215 [9]).

FIG. 25

ReferenceSignalConfig field descriptions

*csi-rs-ResourceConfigMobility*
CSI-RS resources to be used for CSI-RS based RRM measurements.

*ssb-ConfigMobility*
SSB configuration for mobility (nominal SSBs, timing configuration).

FIG. 26

| SSB-ConfigMobility field descriptions |
|---|
| deriveSSB-IndexFromCell |
| If this field is set to *true*, UE assumes SFN and frame boundary alignment across cells on the same frequency carrier as specified in TS 38.133 [14]. Hence, if the UE is configured with a serving cell for which (*absoluteFrequencySSB*, *subcarrierSpacing*) in *ServingCellConfigCommon* is equal to (*ssbFrequency*, *ssbSubcarrierSpacing*) in this *MeasObjectNR*, this field indicates whether the UE can utilize the timing of this serving cell to derive the index of SS block transmitted by neighbour cell. Otherwise, this field indicates whether the UE may use the timing of any detected cell on that target frequency to derive the SSB index of all neighbour cells on that frequency. |
| ssb-ToMeasure |
| The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (see TS 38.215 [9]). When the field is not configured the UE measures on all SS blocks. Regardless of the value of this field, SS/PBCH blocks outside of the applicable *smtc* are not to be measured. See TS 38.215 [9] clause 5.1.1. |

FIG. 27

| Conditional Presence | Explanation |
|---|---|
| *CSI-RS* | This field is mandatory present if *csi-rs-ResourceConfigMobility* is configured, otherwise, it is absent. |
| *SSBorAssociatedSSB* | This field is mandatory present if *ssb-ConfigMobility* is configured or *associatedSSB* is configured in at least one cell. Otherwise, it is absent, Need R. |
| *IntraFreqConnected* | This field is optionally present, Need R if the UE is configured with a serving cell for which (absoluteFrequencySSB, subcarrierSpacing) in ServingCellConfigCommon is equal to (*ssbFrequency*, *ssbSubcarrierSpacing*) in this *MeasObjectNR*, otherwise, it is absent. |

FIG. 28

```
--ASN1START
--TAG-MEASRESULTS-START
MeasResults ::=  SEQUENCE {
  measId    MeasId,
  measResultServingMOList  MeasResultServMOList,
  measResultNeighCells  CHOICE {
  measResultListNR  MeasResultListNR,
  measResultListEUTRA  MeasResultListEUTRA,
  measResultListUTRA-FDD-r16  MeasResultListUTRA-FDD-r16,
  } OPTIONAL, ...,
  [[
  measResultServFreqListEUTRA-SCG  MeasResultServFreqListEUTRA-SCG  OPTIONAL,
  measResultServFreqListNR-SCG  MeasResultServFreqListNR-SCG  OPTIONAL,
  measResultSFTD-EUTRA  MeasResultSFTD-EUTRA  OPTIONAL,
  measResultSFTD-NR  MeasResultCellSFTD-NR  OPTIONAL
  ]],
  [[
  measResultCellListSFTD-NR  MeasResultCellListSFTD-NR  OPTIONAL
  ]],
  [[
  measResultForRSSI-r16  MeasResultForRSSI-r16  OPTIONAL,
  locationInfo-r16  LocationInfo-r16  OPTIONAL,
  ul-PDCP-DelayValueResultList-r16  UL-PDCP-DelayValueResultList-r16  OPTIONAL,
  measResultsSL-r16  MeasResultsSL-r16  OPTIONAL,
  measResultCLI-r16  MeasResultCLI-r16  OPTIONAL
  ]]
}
MeasResultServMOList ::=  SEQUENCE (SIZE (1..maxNrofServingCells)) OF MeasResultServMO MeasResultServMO::=  SEQUENCE {
  servCellId    ServCellIndex,
  measResultServingCell  MeasResultNR,
  measResultBestNeighCell  MeasResultNR  OPTIONAL
  ...
}
MeasResultListNR::=  SEQUENCE (SIZE (1..maxCellReport)) OF MeasResultNR MeasResultNR ::=  SEQUENCE {
  physCellId    PhysCellId, OPTIONAL,
  measResult    SEQUENCE {
    cellResults    SEQUENCE {
      resultsSSB-Cell  MeasQuantityResults  OPTIONAL,
      resultsCSI-RS-Cell  MeasQuantityResults  OPTIONAL
    },
    rsIndexResults  SEQUENCE {
    resultsSSB-Indexes  ResultsPerSSB-IndexList  OPTIONAL,
      resultsCSI-RS-Indexes  ResultsPerCSI-RS-IndexList  OPTIONAL
  } OPTIONAL
  },
  ...
  [[
  cgi-Info    CGI-InfoNR  OPTIONAL,
  ]]
}

MeasResultListEUTRA ::=  SEQUENCE (SIZE (1..maxCellReport)) OF MeasResultEUTRA
```

FIG. 29

```
MeasResultListEUTRA ::=   SEQUENCE (SIZE (1..maxCellReport)) OF MeasResultEUTRA MeasResultEUTRA::=  SEQUENCE {
  eutra-PhysCellId  PhysCellId,
  measResult    MeasQuantityResultsEUTRA, cgi-Info    CGI-InfoEUTRA  OPTIONAL,
  ...
}

MultiBandInfoListEUTRA ::=   SEQUENCE (SIZE (1..maxMultiBands)) OF FreqBandIndicatorEUTRA MeasQuantityResults::=  SEQUENCE {
  rsrp    RSRP-Range  OPTIONAL,
  rsrq    RSRQ-Range  OPTIONAL,
  sinr    SINR-Range  OPTIONAL
}

MeasQuantityResultsEUTRA ::=  SEQUENCE {
  rsrp    RSRP-RangeEUTRA  OPTIONAL,
  rsrq    RSRQ-RangeEUTRA  OPTIONAL,
  sinr    SINR-RangeEUTRA  OPTIONAL
}

ResultsPerSSB-IndexList::=   SEQUENCE (SIZE (1..maxNrofIndexesToReport2)) OF ResultsPerSSB-
Index ResultsPerSSB-Index ::=  SEQUENCE {
  ssb-Index    SSB-Index,
  ssb-Results    MeasQuantityResults  OPTIONAL
}

ResultsPerCSI-RS-IndexList::=   SEQUENCE (SIZE (1..maxNrofIndexesToReport2)) OF ResultsPerCSI-
RS-Index ResultsPerCSI-RS-Index ::=  SEQUENCE {
  csi-RS-Index  CSI-RS-Index,
  csi-RS-Results  MeasQuantityResults  OPTIONAL
}
MeasResultServFreqListEUTRA-SCG ::=   SEQUENCE (SIZE (1..maxNrofServingCellsEUTRA)) OF
MeasResult2EUTRA MeasResultServFreqListNR-SCG ::=  SEQUENCE (SIZE (1..maxNrofServingCells)) OF MeasResult2NR MeasResultListUTRA-FDD-r16 ::=  SEQUENCE (SIZE (1..maxCellReport)) OF MeasResultUTRA-FDD-
r16

MeasResultUTRA-FDD-r16 ::=  SEQUENCE {
  physCellId-r16    PhysCellIdUTRA-FDD-r16,
  measResult-r16    SEQUENCE {
    utra-FDD-RSCP-r16  INTEGER (-5..91)  OPTIONAL,
    utra-FDD-eCn0-r16  INTEGER (0..49)  OPTIONAL
  }
}

MeasResultForRSSI-r16 ::=  SEQUENCE {
  rssi-Result-r16  ENUMERATED{ffs},
  channelOccupancy-r16  INTEGER (0..100)
}
```

FIG. 29 (Cont.)

```
-- ASN1START
-- TAG-SERVINGCELLCONFIG-START

ServingCellConfig ::=   SEQUENCE {
   tdd-UL-DL-ConfigurationDedicated  TDD-UL-DL-ConfigDedicated  OPTIONAL,  -- Cond TDD
   initialDownlinkBWP  BWP-DownlinkDedicated  OPTIONAL,  -- Need M
   downlinkBWP-ToReleaseList  SEQUENCE (SIZE (1..maxNrofBWPs)) OF BWP-Id  OPTIONAL,  --
Need N
   downlinkBWP-ToAddModList  SEQUENCE (SIZE (1..maxNrofBWPs)) OF BWP-Downlink  OPTIONAL,
-- Need N
   firstActiveDownlinkBWP-Id  BWP-Id  OPTIONAL,  -- Cond SyncAndCellAdd
   bwp-InactivityTimer  ENUMERATED {ms2, ms3, ms4, ms5, ms6, ms8, ms10, ms20, ms30,ms40,ms50,
ms60, ms80,ms100, ms200,ms300, ms500,ms750, ms1280, ms1920, ms2560, spare10, spare9, spare8,
spare7, spare6, spare5, spare4, spare3, spare2, spare1 }  OPTIONAL, --Need R
   defaultDownlinkBWP-Id  BWP-Id  OPTIONAL,  -- Need S
   uplinkConfig  UplinkConfig  OPTIONAL,  -- Need M
   supplementaryUplink  UplinkConfig  OPTIONAL,  -- Need M
   pdcch-ServingCellConfig  SetupRelease { PDCCH-ServingCellConfig }  OPTIONAL,  -- Need M
   pdsch-ServingCellConfig  SetupRelease { PDSCH-ServingCellConfig }  OPTIONAL,  -- Need M
   csi-MeasConfig  SetupRelease { CSI-MeasConfig }  OPTIONAL,  -- Need M
   sCellDeactivationTimer  ENUMERATED {ms20, ms40, ms80, ms160, ms200, ms240, ms320, ms400,
ms480, ms520, ms640, ms720, ms840, ms1280, spare2, spare1}  OPTIONAL,  -- Cond
ServingCellWithoutPUCCH
   crossCarrierSchedulingConfig  CrossCarrierSchedulingConfig  OPTIONAL,  -- Need M
   tag-Id  TAG-Id,
   dummy  ENUMERATED {enabled}  OPTIONAL,  -- Need R
   pathlossReferenceLinking  ENUMERATED {spCell, sCell}  OPTIONAL,  -- Cond SCellonly
   servingCellMo  MeasObjectId  OPTIONAL,  -- Cond MeasObject ...,
   [[
   lte-CRS-ToMatchAround  SetupRelease { RateMatchPatternLTE-CRS }  OPTIONAL, -- Need M
   rateMatchPatternToAddModList  SEQUENCE (SIZE (1..maxNrofRateMatchPatterns)) OF
RateMatchPattern  OPTIONAL,  -- Need N
   rateMatchPatternToReleaseList  SEQUENCE (SIZE (1..maxNrofRateMatchPatterns)) OF
RateMatchPatternId  OPTIONAL,  -- Need N
   downlinkChannelBW-PerSCS-List  SEQUENCE (SIZE (1..maxSCSs)) OF SCS-SpecificCarrier
OPTIONAL,  -- Need S
   ]],
   [[
   supplementaryUplinkRelease  ENUMERATED {true}  OPTIONAL,  --Need N
   tdd-UL-DL-ConfigurationDedicated-iab-mt-v16xy  TDD-UL-DL-ConfigDedicated-IAB-MT-v16xy
OPTIONAL,  -- Need FFS
   firstWithinActiveTimeBWP-Id-r16  BWP-Id  OPTIONAL,  -- Cond MultipleNonDormantBWP
   firstOutsideActiveTimeBWP-Id-r16  BWP-Id  OPTIONAL,  -- Cond MultipleNonDormantBWP
   ca-Slotoffset-r16  CHOICE {
   refSCS15KHz  INTEGER (-2..2),
   refSCS30KHz  INTEGER (-5..5),
   refSCS60KHz  INTEGER (-10..10),
   refSCS120KHz  INTEGER (-20..20)
   }  OPTIONAL,  -- Cond AsyncCA
   channelAccessConfig-r16  ChannelAccessConfig-r16  OPTIONAL  -- Need M
   ]]
}
```

FIG. 30

```
UplinkConfig ::=  SEQUENCE {
   initialUplinkBWP  BWP-UplinkDedicated  OPTIONAL,  --Need M
   uplinkBWP-ToReleaseList  SEQUENCE (SIZE (1..maxNrofBWPs)) OF BWP-Id  OPTIONAL,  -- Need N
   uplinkBWP-ToAddModList  SEQUENCE (SIZE (1..maxNrofBWPs)) OF BWP-Uplink  OPTIONAL,  --
Need N
   firstActiveUplinkBWP-Id  BWP-Id  OPTIONAL,  -- Cond SyncAndCellAdd
   pusch-ServingCellConfig  SetupRelease { PUSCH-ServingCellConfig }  OPTIONAL,  -- Need M
   carrierSwitching  SetupRelease { SRS-CarrierSwitching }  OPTIONAL,  -- Need M ...,
   [[
   powerBoostPi2BPSK  BOOLEAN  OPTIONAL,  -- Need M
   uplinkChannelBW-PerSCS-List  SEQUENCE (SIZE (1..maxSCSs)) OF SCS-SpecificCarrier
OPTIONAL,  -- Need S
   ]],
   [[
   bdFactorR-r16  ENUMERATED {n1}  OPTIONAL,  -- Need R
   lte-CRS-PatternList-r16  SetupRelease { LTE-CRS-PatternList-r16 }  OPTIONAL,  -- Cond LTE-CRS
   lte-CRS-PatternListSecond-r16  SetupRelease { LTE-CRS-PatternList-r16 }  OPTIONAL,  -- Cond
CORESETPool
   enablePLRS-UpdateForPUSCH-SRS  ENUMERATED {enabled}  OPTIONAL,  -- Need R
   enableDefaultBeamPL-ForPUSCH0  ENUMERATED {enabled}  OPTIONAL,  -- Need R
   enableDefaultBeamPL-ForPUCCH  ENUMERATED {enabled}  OPTIONAL,  -- Need R
   enableDefaultBeamPL-ForSRS  ENUMERATED {enabled}  OPTIONAL  -- Need R
   ]]
}

ChannelAccessConfig-r16 ::=  SEQUENCE {
   maxEnergyDetectionThreshold-r16  INTEGER (-85..-52),
   energyDetectionThresholdOffset-r16  INTEGER (-20..-13),
   ul-toDL-COT-SharingED-Threshold-r16  INTEGER (-85..-52)  OPTIONAL,  -- Need R
   absenceOfAnyOtherTechnology-r16  ENUMERATED {true}  OPTIONAL  -- Need R
}

-- TAG-SERVINGCELLCONFIG-STOP
-- ASN1STOP
```

FIG. 30 (Cont.)

| *ServingCellConfig* field descriptions |
|---|
| *absenceOfAnyOtherTechnology* <br> Presence of this field indicates absence on a long term basis (e.g. by level of regulation) of any other technology sharing the carrier; absence of this field indicates the potential presence of any other technology sharing the carrier, as specified in TS 37.213 [48] clause Y. |
| *bdFactorR* <br> Parameter for determining and distributing the maximum numbers of BD/CCE for mPDCCH based mPDSCH transmission as specified in TS 38.213 [13] Clause 10.1. |
| *bwp-InactivityTimer* <br> The duration in ms after which the UE falls back to the default Bandwidth Part (see TS 38.321 [3], clause 5.15). When the network releases the timer configuration, the UE stops the timer without switching to the default BWP. |
| *ca-SlotOffset* <br> Slot offset between the primary cell (PCell/PSCell) and the SCell in unaligned frame boundary with slot alignment and partial SFN alignment inter-band CA. Based on this field, the UE determines the time offset of the SCell as specified in clause 4.5 of TS 38.211 [16]. The granularity of this field is determined by the reference SCS for the slot offset (i.e. the maximum of PCell/PSCell lowest SCS among all the configured SCSs in DL/UL *SCS-SpecificCarrierList* in *ServingCellConfig* and this serving cell's lowest SCS among all the configured SCSs in DL/UL *SCS-SpecificCarrierList* in *ServingCellConfig*). <br> The Network configures at most single non-zero offset duration in ms (independent on SCS) among CCs in the unaligned CA configuration. If the field is absent, the UE applies the value of 0. |
| *channelAccessConfig* <br> List of parameters used for access procedures of operation with shared spectrum channel access (see TS 37.213 [48]. |
| *crossCarrierSchedulingConfig* <br> Indicates whether this serving cell is cross-carrier scheduled by another serving cell or whether it cross-carrier schedules another serving cell. |
| *defaultDownlinkBWP-Id* <br> The initial bandwidth part is referred to by BWP-Id = 0. ID of the downlink bandwidth part to be used upon expiry of the BWP inactivity timer. This field is UE specific. When the field is absent the UE uses the initial BWP as default BWP. (see TS 38.213 [13], clause 12 and TS 38.321 [3], clause 5.15). |
| *downlinkBWP-ToAddModList* <br> List of additional downlink bandwidth parts to be added or modified. (see TS 38.213 [13], clause 12). |
| *downlinkBWP-ToReleaseList* <br> List of additional downlink bandwidth parts to be released. (see TS 38.213 [13], clause 12). |
| *downlinkChannelBW-PerSCS-List* <br> A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in *scs-SpecificCarrierList* in *DownlinkConfigCommon* / *DownlinkConfigCommonSIB*. Network only configures channel bandwidth that corresponds to the channel bandwidth values defined in TS 38.101-1 [15] and TS 38.101-2 [39]. |
| *energyDetectionThresholdOffset* <br> Indicates the offset to the default maximum energy detection threshold value. Unit in dB. Value -13 corresponds to -13dB, value -12 corresponds to -12dB, and so on (i.e. in steps of 1dB) as specified in TS 37.213 [48]. |
| *firstActiveDownlinkBWP-Id* <br> If configured for an SpCell, this field contains the ID of the DL BWP to be activated upon performing the RRC (re-)configuration. If the field is absent, the RRC (re-)configuration does not impose a BWP switch. <br> If configured for an SCell, this field contains the ID of the downlink bandwidth part to be used upon MAC-activation of an SCell. The initial bandwidth part is referred to by BWP-Id = 0. <br> Upon PCell change and PSCell addition/change, the network sets the *firstActiveDownlinkBWP-Id* and *firstActiveUplinkBWP-Id* to the same value. |
| *initialDownlinkBWP* <br> The dedicated (UE-specific) configuration for the initial downlink bandwidth-part (i.e. DL BWP#0). If any of the optional IEs are configured within this IE, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1 |
| *lte-CRS-PatternList* <br> A list of LTE CRS patterns around which the UE shall do rate matching for PDSCH. The LTE CRS patterns in this list shall be non-overlapping in frequency. |

FIG. 31

| |
|---|
| *lte-CRS-PatternListSecond* |
| A list of LTE CRS patterns around which the UE shall do rate matching for PDSCH scheduled with a DCI detected on a CORESET with CORESETPoolIndex configured with 1. This list is configured only if CORESETPoolIndex configured with 1. The first LTE CRS pattern in this list shall be fully overlapping in frequency with the first LTE CRS pattern in lte-CRS-PatternList. The second LTE CRS pattern in this list shall be fully overlapping in frequency with the second LTE CRS pattern in lte-CRS-PatternList, and so on. |
| *lte-CRS-ToMatchAround* |
| Parameters to determine an LTE CRS pattern that the UE shall rate match around. |
| *maxEnergyDetectionThreshold* |
| Indicates the absolute maximum energy detection threshold value. Unit in dBm. Value -85 corresponds to -85 dBm, value -84 corresponds to -84 dBm, and so on (i.e. in steps of 1dBm) as specified in TS 37.213 [48]. If the field is not configured, the UE shall use a default maximum energy detection threshold value as specified in TS 37.213 [48]. |
| *pathlossReferenceLinking* |
| Indicates whether UE shall apply as pathloss reference either the downlink of SpCell (PCell for MCG or PSCell for SCG) or of SCell that corresponds with this uplink (see TS 38.213 [13], clause 7). |
| *pdsch-ServingCellConfig* |
| PDSCH related parameters that are not BWP-specific. |
| *rateMatchPatternToAddModList* |
| Resources patterns which the UE should rate match PDSCH around. The UE rate matches around the union of all resources indicated in the rate match patterns. Rate match patterns defined here on cell level apply only to PDSCH of the same numerology. See TS 38.214 [19], clause 5.1.2.2.3. |
| *sCellDeactivationTimer* |
| SCell deactivation timer in TS 38.321 [3]. If the field is absent, the UE applies the value infinity. |
| *servingCellMO* |
| *measObjectId* of the *MeasObjectNR* in *MeasConfig* which is associated to the serving cell. For this *MeasObjectNR*, the following relationship applies between this MeasObjectNR and *frequencyInfoDL* in *ServingCellConfigCommon* of the serving cell: if *ssbFrequency* is configured, its value is the same as the *absoluteFrequencySSB* and if *csi-rs-ResourceConfigMobility* is configured, the value of its *subcarrierSpacing* is present in one entry of the *scs-SpecificCarrierList*, *csi-RS-CellListMobility* includes an entry corresponding to the serving cell (with *cellid* equal to *physCellId* in *ServingCellConfigCommon*) and the frequency range indicated by the *csi-rs-MeasurementBW* of the entry in *csi-RS-CellListMobility* is included in the frequency range indicated by in the entry of the *scs-SpecificCarrierList*. |
| *supplementaryUplink* |
| Network may configure this field only when *supplementaryUplinkConfig* is configured in *ServingCellConfigCommon* or *ServingCellConfigCommonSIB*. |
| *supplementaryUplinkRelease* |
| If this field is included, the UE shall release the uplink configuration configured by *supplementaryUplink*. The network only includes either *supplementaryUplinkRelease* or *supplementaryUplink* at a time. |
| *tag-Id* |
| Timing Advance Group ID, as specified in TS 38.321 [3], which this cell belongs to. |
| *tdd-UL-DL-ConfigurationDedicated-iab-mt v16xy* |
| Resource configuration per IAB-MT D/U/F overrides all symbols (with a limitation that effectively only flexible symbols can be overwritten in Rel-16) per slot over the number of slots as provided by *TDD-UL-DL ConfigurationCommon*. |
| *ul-toDL-COT-SharingED-Threshold* |
| Maximum energy detection threshold that the UE should use to share channel occupancy with gNB for DL transmission with length no longer than 2, 4, and 8 OFDM symbols for 15Khz, 30Khz, 60KHz SCS respectively, as specified in TS 37.213 [48]. |
| *uplinkConfig* |
| Network may configure this field only when *uplinkConfigCommon* is configured in *ServingCellConfigCommon* or *ServingCellConfigCommonSIB*. |

FIG. 31 (Cont.)

| *UplinkConfig* field descriptions |
|---|
| *carrierSwitching* |
| Includes parameters for configuration of carrier based SRS switching (see TS 38.214 [19], clause 6.2.1.3. |
| *enableDefaultBeamPlForPUSCH0_0, enableDefaultBeamPlForPUCCH, enableDefaultBeamPlForSRS* |
| When the parameter is present, UE derives the spatial relation and the corresponding pathloss reference Rs as specified in 38.213, clauses 7.1.1, 7.2.1, 7.3.1 and 9.2.2The network only configures these parameters for FR2. |
| *enablePLRSupdateForPUSCHSRS* |
| When this parameter is present, the Rel-16 feature of MAC CE based pathloss RS updates for PUSCH/SRS is enabled. Network only configures this parameter , when the UE is configured with *sri-PUSCH-PowerControl*. |
| *firstActiveUplinkBWP-Id* |
| If configured for an SpCell, this field contains the ID of the UL BWP to be activated upon performing the RRC (re-)configuration. If the field is absent, the RRC (re-)configuration does not impose a BWP switch. If configured for an SCell, this field contains the ID of the uplink bandwidth part to be used upon MAC-activation of an SCell. The initial bandwidth part is referred to by BandiwdthPartId = 0. |
| *initialUplinkBWP* |
| The dedicated (UE-specific) configuration for the initial uplink bandwidth-part (i.e. UL BWP#0). If any of the optional IEs are configured within this IE as part of the IE *uplinkConfig*, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1 |
| *powerBoostPi2BPSK* |
| If this field is set to *true*, the UE determines the maximum output power for PUCCH/PUSCH transmissions that use pi/2 BPSK modulation according to TS 38.101-1 [15], clause 6.2.4. |
| *pusch-ServingCellConfig* |
| PUSCH related parameters that are not BWP-specific. |
| *uplinkBWP-ToAddModList* |
| The additional bandwidth parts for uplink to be added or modified. In case of TDD uplink- and downlink BWP with the same *bandwidthPartId* are considered as a BWP pair and must have the same center frequency. |
| *uplinkBWP-ToReleaseList* |
| The additional bandwidth parts for uplink to be released. |
| *uplinkChannelBW-PerSCS-List* |
| A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in *scs-SpecificCarrierList* in *UplinkConfigCommon* / *UplinkConfigCommonSIB*. Network only configures channel bandwidth that corresponds to the channel bandwidth values defined in TS 38.101-1 [15] and TS 38.101-2 [39]. |

FIG. 32

| Conditional Presence | Explanation |
|---|---|
| *AsyncCA* | This field is mandatory present for SCells whose slot offset between the SpCell is not 0. Otherwise it is absent, Need S. |
| *CORESETPool* | This field is optionally present, Need M, if the field *lte-CRS-ToMatchAround* is not configured and CORESETPoolIndex configured with 1. It is absent otherwise. |
| *LTE-CRS* | This field is optionally present, Need M, if the field *lte-CRS-ToMatchAround* is not configured. It is absent otherwise. |
| *MeasObject* | This field is mandatory present for the SpCell if the UE has a *measConfig*, and it is optionally present, Need M, for SCells. |
| *MultipleNonDormantBWP* | The field is mandatory present when the SCell is configured with more than one *BWP-DownlinkDedicated* with *pdcch-Config* present, otherwise it is absent. |
| *MultipleNonDormantBWP-WUS* | The field is mandatory present when the SCell is configured with WUS and with more than one *BWP-DownlinkDedicated* with *pdcch-Config* present, otherwise it is absent. |
| *SCellOnly* | This field is optionally present, Need R, for SCells. It is absent otherwise. |
| *ServingCellWithoutPUCCH* | This field is optionally present, Need S, for SCells except PUCCH SCells. It is absent otherwise. |
| *SyncAndCellAdd* | This field is mandatory present for a SpCell upon PCell change and PSCell addition/change and upon *RRCSetup/RRCResume*.<br>The field is mandatory present for an SCell upon addition. For SpCell, the field is optionally present, Need N, upon reconfiguration without *reconfigurationWithSync*.<br>In all other cases the field is absent. |
| *TDD* | This field is optionally present, Need R, for TDD cells. It is absent otherwise. |

FIG. 33

```
-- ASN1START
-- TAG-MEASUREMENTREPORT-START

MeasurementReport ::=               SEQUENCE {
    criticalExtensions                  CHOICE {
        measurementReport                   MeasurementReport-IEs,
        criticalExtensionsFuture            SEQUENCE {}
    }
}

MeasurementReport-IEs ::=           SEQUENCE {
    measResults                         MeasResults, lateNonCriticalExtension            OCTET STRING
OPTIONAL,
    nonCriticalExtension                SEQUENCE{}
OPTIONAL
}

-- TAG-MEASUREMENTREPORT-STOP
-- ASN1STOP
```

FIG. 34

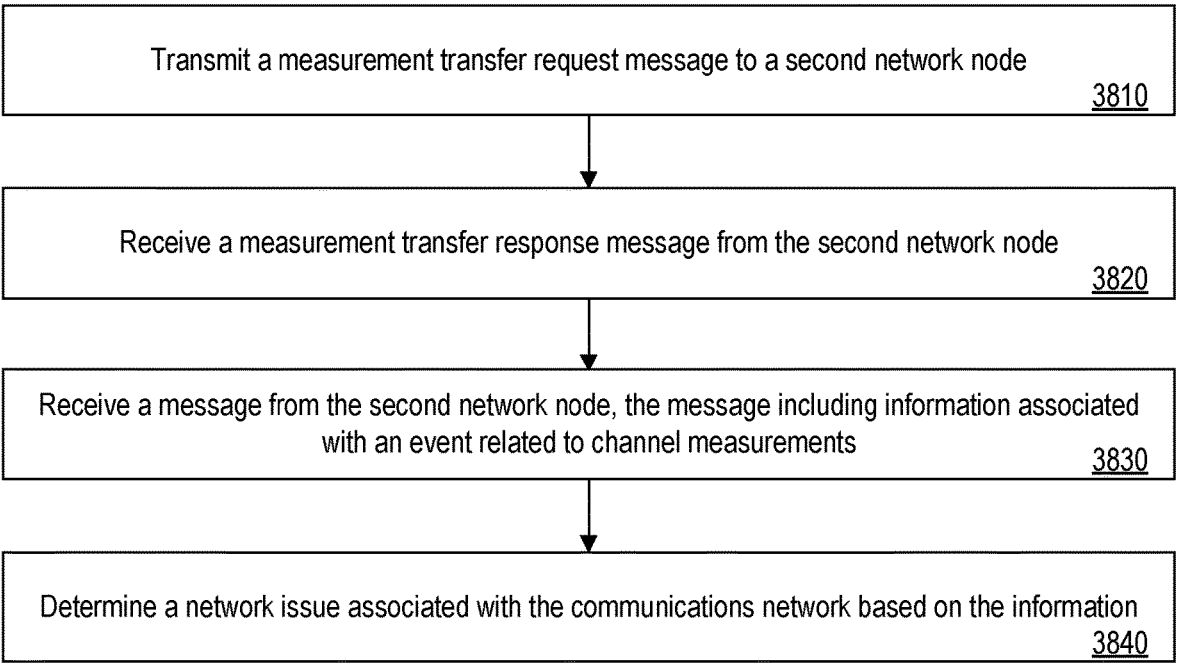

Transmit a measurement transfer request message to a second network node
3810

Receive a measurement transfer response message from the second network node
3820

Receive a message from the second network node, the message including information associated with an event related to channel measurements
3830

Determine a network issue associated with the communications network based on the information
3840

FIG. 38

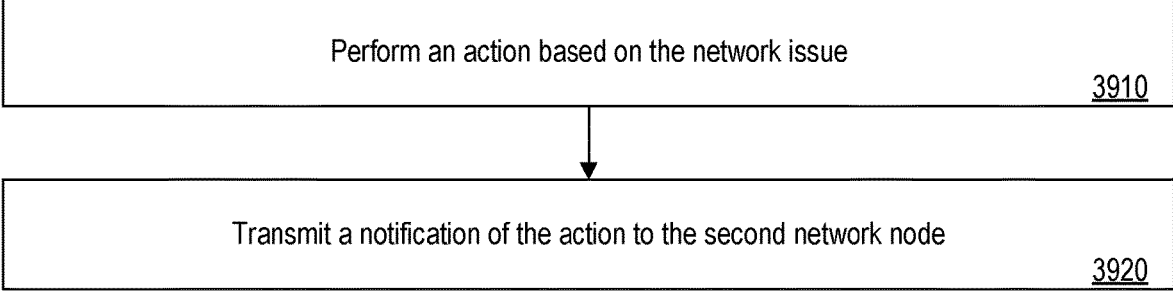

Perform an action based on the network issue
3910

Transmit a notification of the action to the second network node
3920

FIG. 39

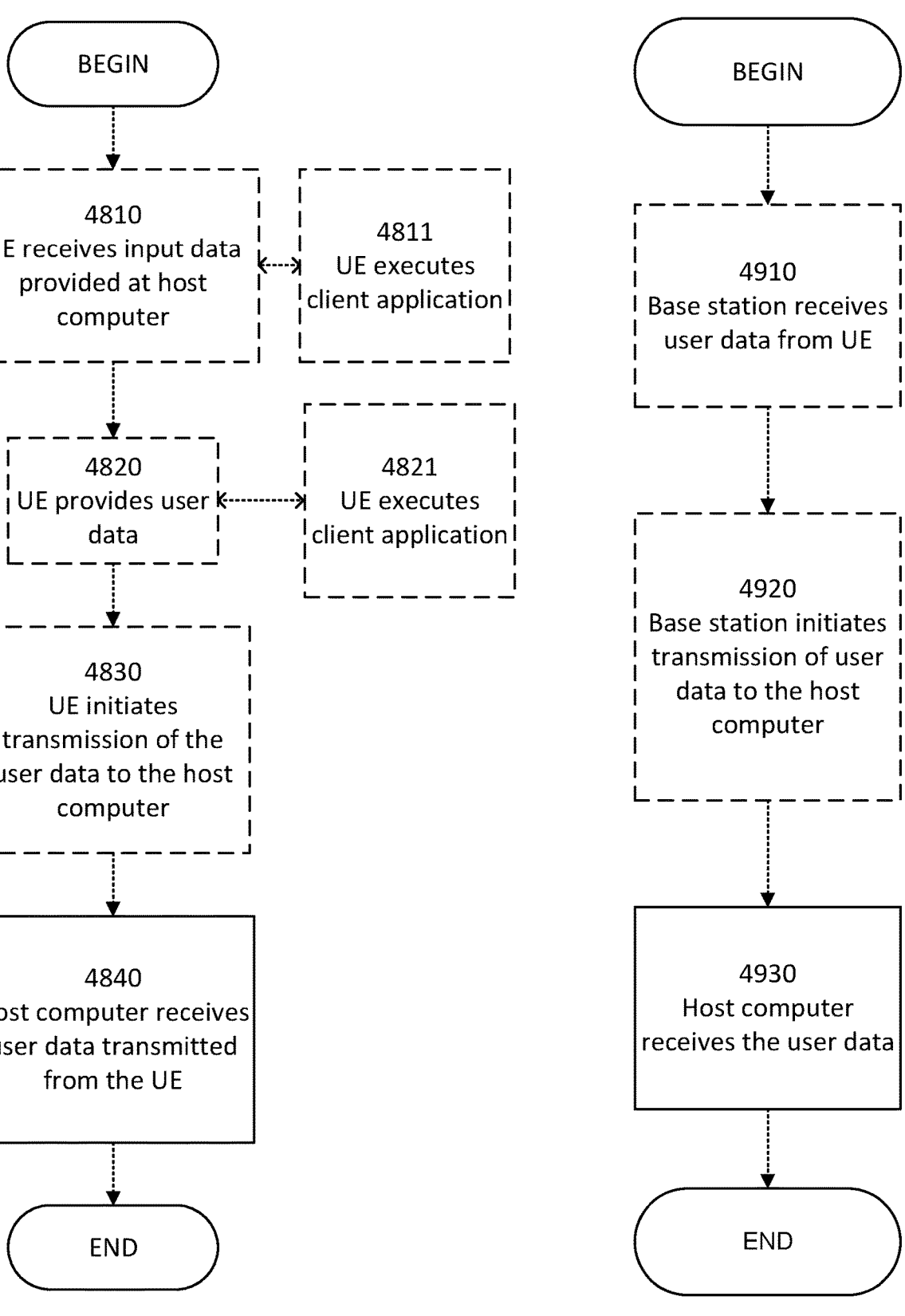
FIG. 47              FIG. 48

TRANSFERRING EVENTS RELATED TO BEAM MEASUREMENTS

CROSS REFERENCE TO RELATED APPLICATIONS

This application is a 35 U.S.C. § 371 national stage application of PCT International Application No. PCT/SE2021/050775 filed on Aug. 5, 2021, which in turn claims domestic priority to U.S. Provisional Patent Application No. 63/061,946, filed on Aug. 6, 2020, the disclosures and content of which are incorporated by reference herein in their entirety.

TECHNICAL FIELD

The present disclosure is related to wireless communication systems and more particularly to transferring events related to beam measurements.

BACKGROUND

FIG. 1 illustrates an example of a 5$^{th}$ Generation ("5G") network (also referred to as a new radio ("NR") network) including a network node 102 (e.g., a 5G base station ("gNB")), multiple communication devices 104 (also referred to as user equipment ("UE")), and a neighbor network node 106. In this example, some of the communication devices 104 are within a coverage area 112 of network node 102, some of the communication devices 104 are within a coverage area 116 of neighbor network node 106, and some of the communication devices 104 are within both coverage area 112 and coverage area 116.

FIG. 2 illustrates an example of a next generation ("NG") (also referred to as NR) system architecture. The NG-radio access network ("RAN") node 210 includes a set of gNBs 220, 230 connected to the 5G core ("5GC") network through a NG interface. Each of the gNB 220, 230 can support frequency division duplexing ("FDD") mode, time division duplexing ("TDD") mode or dual mode operation. Each of the gNBs 220, 230 can be interconnected through a Xn interface. Each of the gNBs 220, 230 can include a gNB-CU 222, 232 and gNB-distributed units ("DUs") 224a-b, 232a-b. Each of the gNB-CU 222, 232 can be connected with gNB-DU 224a-b, 234a-b of their respective gNB 220, 230 by a F1 logical interface. In this example, each gNB-DU 224a-b, 234a-b is connected to only one gNB-CU 222, 232. For resiliency, a gNB-DU 224a-b, 234a-b may be connected to multiple gNB-CU by appropriate implementation. The NG, Xn, and F1 interfaces can be logical interfaces. The NG-RAN node can be layered into a radio network layer ("RNL") and a transport network layer ("TNL"). The NG-RAN architecture (e.g., the NG-RAN logical nodes and interfaces between them) can be part of the RNL. For each NG-RAN interface (NG, Xn, F1) the related TNL protocol and the functionality can be specified. The TNL can provide services for user plane transport and signaling transport.

A gNB may also be connected to a long term evolution ("LTE") base station ("eNB") via an X2 interface. Another architectural option is that where an LTE eNB connected to the Evolved Packet Core network is connected over the X2 interface with a so called nr-gNB, the latter is a gNB not connected directly to a CN and connected via X2 to an eNB for the sole purpose of performing dual connectivity.

The architecture in FIG. 2 can be expanded by splitting one or more of the gNB-CUs 222, 232 into two entities. One gNB-CU-user plane ("UP"), which serves the user plane and hosts the packet data convergence protocol ("PDCP") and one gNB-CU-control plane ("CP"), which serves the control plane and hosts the PDCP and radio resource control ("RRC") protocol. A gNB-DU can host the radio link control ("RLC")/media access control ("MAC")/physical layer ("PHY") protocols.

SUMMARY

According to some embodiments, a method of operating a first network node operating in a communications network that includes a second network node is provided. The method can include receiving a message from the second network node. The message can include information associated with an event detected by a neighbor network node that is different than the first network node. The event can be related to channel measurements associated with the neighbor network node operating in the communications network. The method can further include determining a network issue associated with the communications network based on the information.

According to other embodiments, a communication device, a network node, computer program, and/or computer program product is provided for performing one or more of the above methods.

Various embodiments described herein enable a first radio access network ("RAN") node to use events defined for synchronization signal block ("SSB") beams and channel status indicator ("CSI")-reference signal ("RS") beam measurements received from a second RAN node to resolve capacity and coverage issues.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a diagram illustrating an example of a synchronization signal block ("SSB")-index information element ("IE");

FIG. 4 is a diagram illustrating an example of a SSB-machine type communication ("MTC") IE;

FIG. 5 is a table illustrating an example of SSB-MTC field descriptions;

FIG. 6 is a table illustrating an example of SSB-MTC2 field descriptions;

FIG. 7 is a table illustrating an example of SSB-MTC3 field descriptions;

FIG. 8 is a diagram illustrating an example of a SSB-PositionQCL-Relationship IE;

FIG. 9 is a diagram illustrating an example of a SSB-ToMeasure IE;

FIG. 10 is a table illustrating an example of SSB-ToMeasure field descriptions;

FIG. 11 is a diagram illustrating an example of a non-zero power ("NZP")-CSI-RS-Resource IE;

FIG. 12 is a table illustrating an example of NZP-CSI-RS-Resource field descriptions;

FIG. 13 is a table illustrating examples of explanations of conditional presences;

FIG. 14 is a diagram illustrating an example of a NZP-CSI-RS-ResourceId IE;

FIG. 15 is a diagram illustrating an example of a NZP-CSI-RS-ResourceSet IE;

FIG. 16 is a table illustrating an example of NZP-CSI-RS-ResourceSet field descriptions;

FIG. 17 is a diagram illustrating an example of a NZP-CSI-RS-ResourceSetId;

FIG. 18 is a diagram illustrating an example of a CSI-RS-ResourceConfigMobility IE;

FIG. 19 is a table illustrating an example of CSI-RS-CellMobility field descriptions;

FIG. 20 is a table illustrating an example of CSI-RS-ResourceConfigMobility field descriptions;

FIG. 21 is a diagram illustrating an example of a NR-RS-Type IE;

FIG. 22 is a diagram illustrating an example of a MeasObjectNR IE;

FIG. 23 is a table illustrating an example of CellsToAddMod field descriptions;

FIG. 24 is a table illustrating an example of MeasObjectNR field descriptions;

FIG. 25 is a table illustrating an example of RMTC-Config field descriptions;

FIG. 26 is a table illustrating an example of ReferenceSignalConfig field descriptions;

FIG. 27 is a table illustrating an example of SSB-ConfigMobility field descriptions;

FIG. 28 is a table illustrating an example of explanations for conditional presences;

FIG. 29 is a diagram illustrating an example of a MeasResults IE;

FIG. 30 is a diagram illustrating an example of a ServingCellConfig IE;

FIG. 31 is a table illustrating an example of ServingCellConfig field descriptions;

FIG. 32 is a table illustrating an example of UplinkConfig field descriptions;

FIG. 33 is a table illustrating an example of explanations of conditional presences;

FIG. 34 is a diagram illustrating an example of a MeasurementReport message;

FIGS. 38-39 are flow charts illustrating examples of operations performed by a network node in accordance with some embodiments;

FIG. 47 is a block diagram of methods implemented in a communication system including a host computer, a base station, and a user equipment in accordance with some embodiments; and FIG. 48 is a block diagram of methods implemented in a communication system including a host computer, a base station, and a user equipment in accordance with some embodiments.

DETAILED DESCRIPTION

Figure 1:
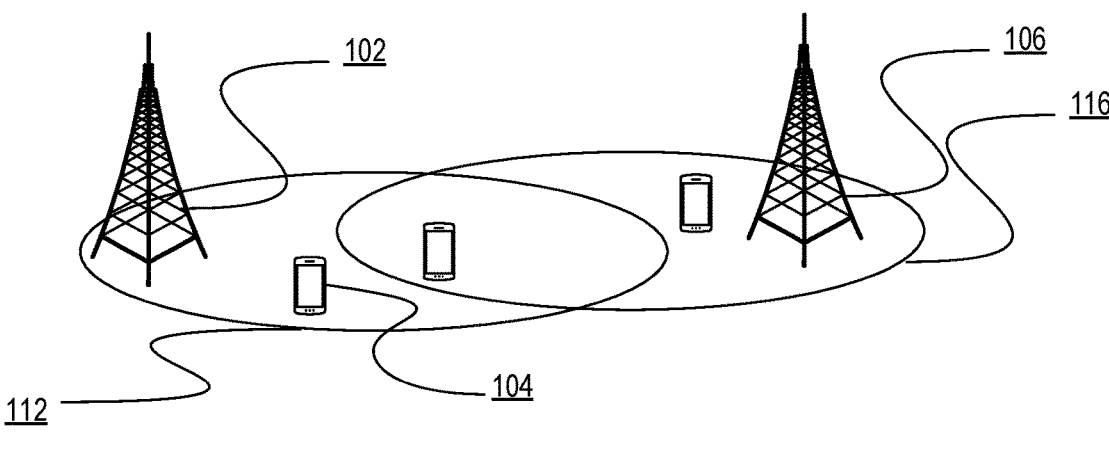
FIG. 1 is a schematic diagram illustrating an example of a 5th generation ("5G") network.
Figure 2:
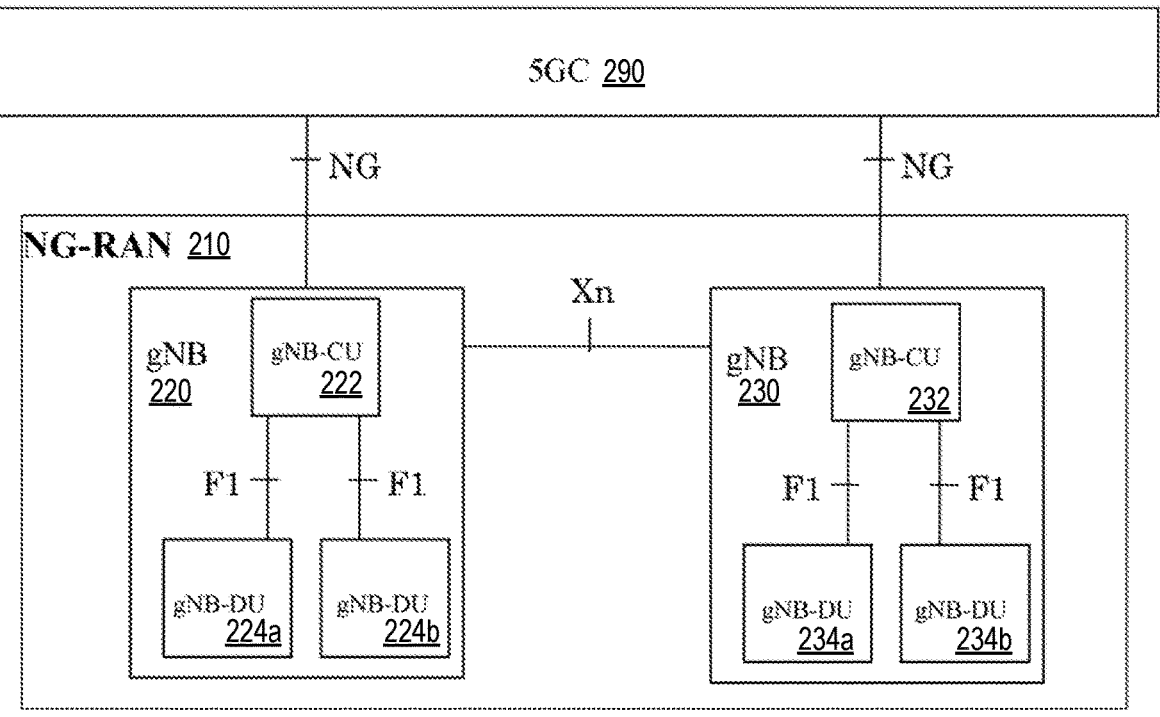
FIG. 2 is a block diagram illustrating an example of a NR network system architecture.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

New radio ("NR") Reference Signals are described below.

Two types of reference signals are defined for NR, SSB and CSI-RS. Some of their characteristics are reported below from the 3GPP TS 38.331.

FIG. 3 illustrates an example of a synchronization signal block ("SSB")-index information element ("IE"), as described in TS 38.213, clause 4.1, which identifies an SS-Block within an SS-Burst.

FIG. 4 illustrates an example of a SSB-machine type communication ("MTC") IE, which can be used to configure measurement timing configurations (e.g., timing occasions at which the UE measures SSBs).

FIG. 5 includes a table illustrating an example of SSB-MTC field descriptions.

FIG. 6 includes a table illustrating an example of SSB-MTC2 field descriptions.

FIG. 7 includes a table illustrating an example of SSB-MTC3 field descriptions.

FIG. 8 illustrates an example of a SSB-PositionQCL-Relationship IE, which can be used to indicate the QCL relationship between SSB positions on the frequency indicated by ssbFrequency (see TS 38.213, clause 4.1). Value n1 corresponds to 1, value n2 corresponds to 2 and so on.

FIG. 9 illustrates an example of a SSB-ToMeasure IE, which can be used to configure a pattern of SSBs.

FIG. 10 includes a table illustrating an example of SSB-ToMeasure field descriptions.

Channel status information ("CSI")-reference signals ("RSs") are described below.

FIG. 11 illustrates an example of a non-zero power ("NZP")-CSI-RS-Resource IE. The NZP-CSI-RS-Resource IE can be used to configure NZP-CSI-RS transmitted in the cell where the IE is included, which the UE may be configured to measure on (see TS 38.214, clause 5.2.2.3.1). A change of configuration between periodic, semi-persistent or aperiodic for an NZP-CSI-RS-Resource may be supported with a release and add.

FIG. 12 includes a table that illustrates an example of NZP-CSI-RS-Resource field descriptions.

FIG. 13 includes a table that illustrates examples of explanations of conditional presences.

FIG. 14 illustrates an example of a NZP-CSI-RS-ResourceId IE, which can be used to identify one NZP-CSI-RS-Resource.

FIG. 15 illustrates an example of a NZP-CSI-RS-ResourceSet IE, which is a set of NZP-CSI-RS resources (their IDs) and set-specific parameters.

FIG. 16 includes a table illustrating examples of NZP-CSI-RS-ResourceSet field descriptions.

FIG. 17 illustrates an example of a NZP-CSI-RS-ResourceSetId, which can be used to identify one NZP-CSI-RS-ResourceSet.

FIG. 18 illustrates an example of a CSI-RS-ResourceConfigMobility IE, which can be used to configure CSI-RS based RRM measurements.

FIG. 19 includes a table illustrating examples of CSI-RS-CellMobility field descriptions.

FIG. 20 includes a table illustrating examples of CSI-RS-ResourceConfigMobility field descriptions.

New radio ("NR") measurement configuration and results are discussed below.

The network may configure an RRC_CONNECTED UE to perform measurements. The network may configure the UE to report them in accordance with the measurement configuration or perform conditional configuration evaluation in accordance with the conditional configuration. The measurement configuration can be provided by means of dedicated signaling, for example, using the RRCReconfiguration or RRCResume.

The network may configure the UE to perform the following types of measurements: NR measurements; Inter-radio access technology ("RAT") measurement of Evolved Universal Terrestrial Radio Access ("E-UTRA") frequencies; and Inter-RAT measurements of universal mobile telecommunications system terrestrial radio access ("UTRA")-frequency division duplexing ("FDD") frequencies.

The network may configure the UE to report the following measurement information based on synchronization signal ("SS") SS/physical broadcast channel ("PBCH") block(s): measurement results per SS/PBCH block; measurement results per cell based on SS/PBCH block(s); and SS/PBCH block(s) indexes.

The network may configure the UE to report the following measurement information based on CSI-RS resources: measurement results per CSI-RS resource; measurement results per cell based on CSI-RS resource(s); and CSI-RS resource measurement identifiers.

The network may configure the UE to perform constant bit rate ("CBR") measurements for sidelink.

The network may configure the UE to report the following measurement information based on sound reference signal ("SRS") resources: measurement results per SRS resource; and SRS resource(s) indexes.

The network may configure the UE to report the following measurement information based on command line interface ("CLI")-received signal strength indicator ("RSSI") resources: measurement results per CLI-RSSI resource; and CLI-RSSI resource(s) indexes.

The measurement configuration includes the following parameters: measurement objects, reporting configurations, measurement identities, quantity configurations, and measurement gaps.

Measurement objects can include a list of objects on which the UE can perform the measurements.

Reporting configurations can include a list of reporting configurations where there can be one or multiple reporting configurations per measurement object. Each measurement reporting configuration can include reporting criterion, RS type, and reporting format. The reporting criterion can be a criterion that triggers the UE to send a measurement report. This can either be periodical or a single event description. The RS type can be the RS that the UE uses for beam and cell measurement results (SS/PBCH block or CSI-RS). The reporting format can include the quantities per cell and per beam that the UE includes in the measurement report (e.g., received signal receive power ("RSRP")) and other associated information such as the maximum number of cells and the maximum number of beams per cell to report. In case of conditional configuration triggering configuration, each configuration can include execution criteria and RS type. The execution criteria can include criteria that triggers the UE to perform conditional configuration execution. The RS type can include the RS that the UE uses for beam and cell measurement results (SS/PBCH block or CSI-RS) for conditional configuration execution condition.

Measurement identities can include, for measurement reporting, a list of measurement identities where each measurement identity links one measurement object with one reporting configuration.

Quantity configurations can include the measurement filtering configuration used for all event evaluation, related reporting, and for periodical reporting of that measurement.

Measurement gaps can include periods that the UE may use to perform measurements.

In new radio-dual connectivity ("NR-DC"), the UE may receive two independent measConfig. The first measConfig may be associated with a master cell group ("MCG"), that is included in the RRCReconfiguration message received via a signaling radio bearer 1 ("SRB1"). The second measConfig may be associated with a secondary cell group ("SCG"), that is included in the RRCReconfiguration message received via SRB3, or, alternatively, included within a RRCReconfiguration message embedded in a RRCReconfiguration message received via SRB1.

The IE ReportConfigNR can specify criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS. The following are examples of CHO or CPC events.

Event A1: Serving becomes better than absolute threshold.

Event A2: Serving becomes worse than absolute threshold.

Event A3: Neighbor becomes amount of offset better than PCell/PSCell.

Event A4: Neighbor becomes better than absolute threshold.

Event A5: PCell/PSCell becomes worse than absolute threshold1 AND Neighbor/SCell becomes better than another absolute threshold2.

Event A6: Neighbor becomes amount of offset better than SCell.

Event B1: Inter RAT neighbor becomes better than threshold.

Event B2: PCell becomes worse than threshold1 and inter RAT neighbor becomes better than threshold2.

Event I1: Interference becomes higher than threshold.

Event C1: The NR sidelink channel busy ratio is above a threshold.

Event C2: The NR sidelink channel busy ratio is below a threshold.

Event V1: The V2X sidelink channel busy ratio is above a threshold.

Event V2: The V2X sidelink channel busy ratio is below a threshold.

The events A1, A2, A3, A4, A5, A6, B1, B2 are based on either SSB reference signals or CSI-RS reference signals as indicated by the NR-RS-Type IE illustrated in FIG. 21.

FIG. 22 illustrates an example of a MeasObjectNR IE, which can specify information applicable for SS/PBCH block(s) intra/inter-frequency measurements and/or CSI-RS intra/inter-frequency measurements.

FIG. 23 includes a table illustrating an example of CellsToAddMod field descriptions.

FIG. 24 includes a table illustrating an example of MeasObjectNR field descriptions.

FIG. 25 includes a table illustrating an example of RMTC-Config field descriptions.

FIG. 26 includes a table illustrating an example of ReferenceSignalConfig field descriptions.

FIG. 27 includes a table illustrating an example of SSB-ConfigMobility field descriptions.

FIG. 28 includes a table illustrating an example of explanations for conditional presences.

FIG. 29 illustrates an example of a MeasResults IE, which can cover measured results for intra-frequency, inter-frequency, and inter-RAT mobility.

FIG. 30 illustrates an example of a ServingCellConfig IE. The ServingCellConfig IE can be used to configure (e.g., add or modify) the UE with a serving cell, which may be the SpCell or an SCell of an MCG or SCG. The parameters herein are mostly UE specific but partly also cell specific (e.g. in additionally configured bandwidth parts). Reconfiguration between a physical uplink control channel ("PUCCH") SCell and a SCell without a PUCCH is only supported using an SCell release and add.

FIG. 31 includes a table illustrating an example of ServingCellConfig field descriptions.

FIG. 32 includes a table illustrating an example of UplinkConfig field descriptions.

If the dedicated part of initial uplink ("UL")/downlink ("DL") bandwidth part ("BWP") configuration is absent, the initial BWP can be used but with some limitations. For example, changing to another BWP may require a RRCReconfiguration since DCI format 1_0 doesn't support DCI-based switching.

FIG. 33 includes a table illustrating an example of explanations of conditional presences.

FIG. 34 illustrates an example of a MeasurementReport message, which can be used for the indication of measurement results.

In some embodiments, events can be triggered by measurements of SSB and CSI-RS signals available at a RAN node. Example of some events are described below.

In some examples, an event can include a serving CSI-RS becoming worse than a first threshold and a serving SSB becoming better than a second threshold.

In additional or alternative examples, an event can include a serving CSI-RS becoming worse than a first threshold and a neighbor SSB becoming better than a second threshold.

In additional or alternative examples, an event can include a serving SSB becoming worse than a threshold and serving CSI-RS becoming an offset better than a serving SSB.

In additional or alternative examples, an event can include a neighbor SSB becoming an amount of offset better than a serving CSI-RS.

In additional or alternative examples, an event can include a neighbor SSB becoming a first offset better than a serving CSI-RS and a neighbor SSB becoming a second offset better than a serving SSB.

In additional or alternative examples, an event can include a serving SSB becoming worse than a first threshold and a serving CSI-RS becoming better than a second threshold.

In additional or alternative examples, an event can include a serving CSI-RS becoming better than a first threshold, a serving SSB becoming worse than a second threshold, and a neighbor SSB becoming better than third threshold.

In additional or alternative examples, an event can include a serving CSI-RS becoming an offset better than a neighbor SSB.

In additional or alternative examples, an event can include a serving CSI-RS becoming better than a first threshold and a neighbor SSB becoming worse than a second threshold.

In additional or alternative examples, an event can include a serving SSB becoming an offset better than a serving CSI-RS.

In additional or alternative examples, an event can include a serving SSB becoming better than a first threshold and a serving CSI-RS becoming worse than a second threshold.

In additional or alternative examples, an event can include a serving cell (e.g., a PCell or PSCell) SSB becoming worse than a threshold and a T310 timer is not running.

In additional or alternative examples, an event can include a serving cell (e.g., a PCell or PSCell) CSI-RS becoming worse than a threshold and a T310 timer is not running.

In some examples, a system where events (like the ones above) are monitored/detected by a network node, there may be no support for awareness of such events in neighboring network nodes where the event was not recorded.

In various embodiments herein, awareness of these types of events in neighboring network nodes improve root cause analysis and troubleshooting of capacity and coverage optimization ("CCO") issues.

In some embodiments, correlating the occurrence of events in a neighbor network node, with events collected at a serving network node, allow the serving network node to determine what is, for example, the cause of a coverage or capacity issue and what is the most efficient way to resolve it.

In some embodiments, the capability to solve CCO issues is improved by exchanging events and associated measurements from a first RAN node with a second RAN node. The events can be related to measurements collected by a communication device on SSB beams and CSI-RS beams and reported to the first network node.

In additional or alternative embodiments, a first network node requests a second network node report reference signal related events. In some examples, the first network transmits a message named measurement transfer request to the second network node, which can indicate specific signal related events to report. The first network node may request reporting of specific events or of all the events relative to RS related measurements. For example, the first network node may request reporting of events relative to measurements of SSB and SCI-RS signals.

In additional or alternative embodiments, responsive to receiving the request from the first network node, the second network node can transmit an indication of whether such reporting has been successfully configured. Such indication can be achieved via a message named measurement transfer response.

In additional or alternative embodiments, once the configuration of measurements has been completed, the second network node may transmit a report to the first network node indicating the events monitored via a message or series of messages in a procedure that can be named a measurement transfer update.

In additional or alternative embodiments, the events received in the measurement transfer update may be interpreted by the first network node in isolation or in combination with similar events recorded in the cells of the first network node or in combination with events recorded at other neighboring network nodes and reported to the first network node.

Figure 35:
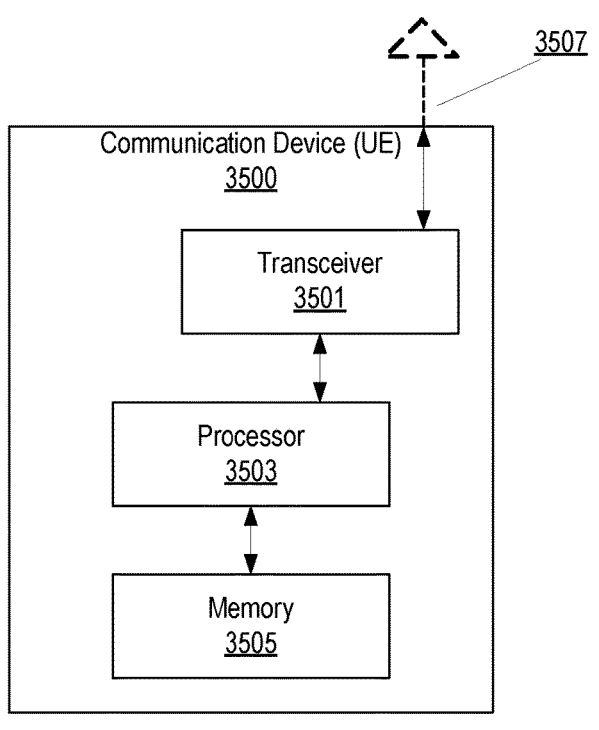
FIG. 35 is a block diagram illustrating an example of a communication device in accordance with some embodiments.

FIG. 35 is a block diagram illustrating elements of a communication device 3500 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 3500 may be provided, for example, as discussed below with respect to wireless device 4110 of FIG. 40.) As shown, communication device 3500 may include an antenna 3507 (e.g., corresponding to antenna 4111 of FIG. 40), and transceiver circuitry 3501 (also referred to as a transceiver, e.g., corresponding to interface 4114 of FIG. 40) including a transmitter and a receiver configured to provide uplink and downlink radio communications with a base station(s) (e.g., corresponding to network node 4160 of FIG. 40, also referred to as a RAN node) of a radio access network. Communication device 3500 may also include processing circuitry 3503 (also referred to as a processor, e.g., corresponding to processing circuitry 4120 of FIG. 40) coupled to the transceiver circuitry, and memory circuitry 3505 (also referred to as memory, e.g., corresponding to device readable medium 4130 of FIG. 40) coupled to the processing circuitry. The memory circuitry 3505 may include computer readable program code that when executed by the processing circuitry 3503 causes the processing circuitry to perform operations according to embodiments disclosed herein. According to other embodiments, processing circuitry 3503 may be defined to include memory so that separate memory circuitry is not required. Communication device 3500 may also include an interface (such as a user interface) coupled with processing circuitry 3503, and/or communication device UE may be incorporated in a vehicle.

As discussed herein, operations of communication device 3500 may be performed by processing circuitry 3503 and/or transceiver circuitry 3501. For example, processing circuitry 3503 may control transceiver circuitry 3501 to transmit communications through transceiver circuitry 3501 over a radio interface to a radio access network node (also referred to as a base station) and/or to receive communications through transceiver circuitry 3501 from a RAN node over a radio interface. Moreover, modules may be stored in memory circuitry 3505, and these modules may provide instructions so that when instructions of a module are executed by processing circuitry 3503, processing circuitry 3503 performs respective operations.

Figure 36:
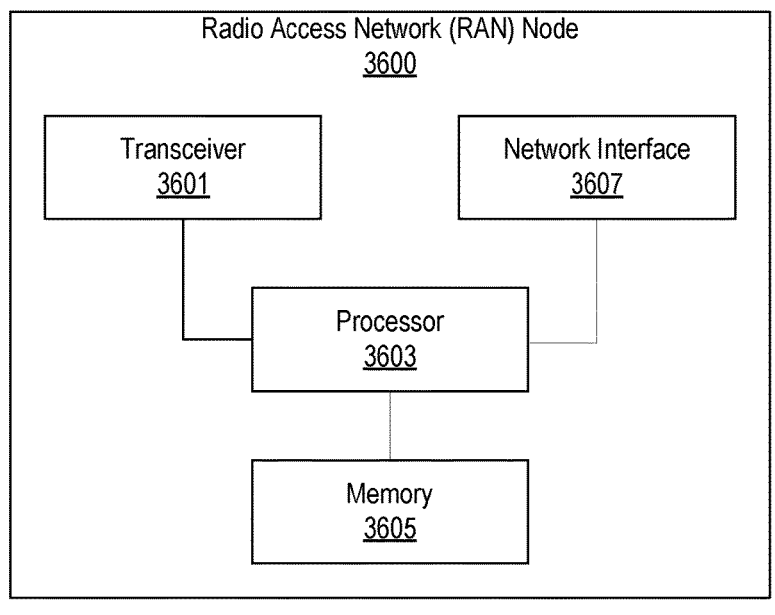
FIG. 36 is a block diagram illustrating an example of a radio access network ("RAN") node in accordance with some embodiments.

FIG. 36 is a block diagram illustrating elements of a radio access network ("RAN") node 3600 (also referred to as a network node, base station, eNodeB/eNB, gNodeB/gNB, etc.) of a Radio Access Network (RAN) configured to provide cellular communication according to embodiments of inventive concepts. (RAN node 3600 may be provided, for example, as discussed below with respect to network node 4160 of FIG. 40.) As shown, the RAN node 3600 may include transceiver circuitry 3601 (also referred to as a transceiver, e.g., corresponding to portions of interface 4190 of FIG. 40) including a transmitter and a receiver configured to provide uplink and downlink radio communications with mobile terminals. The RAN node 3600 may include network interface circuitry 3607 (also referred to as a network interface, e.g., corresponding to portions of interface 4190 of FIG. 40) configured to provide communications with other nodes (e.g., with other base stations) of the RAN and/or core network CN. The RAN node 3600 may also include processing circuitry 3603 (also referred to as a processor, e.g., corresponding to processing circuitry 4170) coupled to the transceiver circuitry, and memory circuitry 3605 (also referred to as memory, e.g., corresponding to device readable medium 4180 of FIG. 40) coupled to the processing circuitry. The memory circuitry 3605 may include computer readable program code that when executed by the processing circuitry 3603 causes the processing circuitry to perform operations according to embodiments disclosed herein. According to other embodiments, processing circuitry 3603 may be defined to include memory so that a separate memory circuitry is not required.

As discussed herein, operations of the RAN node 3600 may be performed by processing circuitry 3603, network interface 3607, and/or transceiver 3601. For example, processing circuitry 3603 may control transceiver 3601 to transmit downlink communications through transceiver 3601 over a radio interface to one or more mobile terminals UEs and/or to receive uplink communications through transceiver 3601 from one or more mobile terminals UEs over a radio interface. Similarly, processing circuitry 3603 may control network interface 3607 to transmit communications through network interface 3607 to one or more other network nodes and/or to receive communications through network interface from one or more other network nodes. Moreover, modules may be stored in memory 3605, and these modules may provide instructions so that when instructions of a module are executed by processing circuitry 3603, processing circuitry 3603 performs respective operations (e.g., operations discussed below with respect to Example Embodiments relating to network nodes).

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 37:
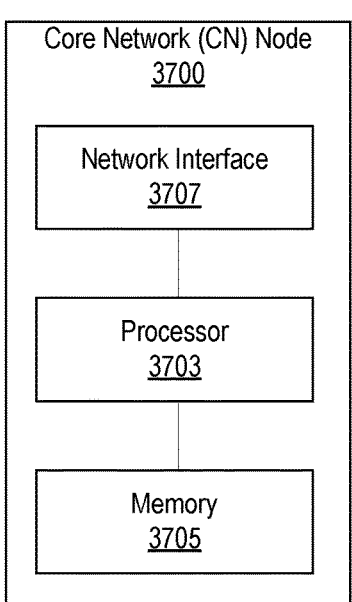
FIG. 37 is a block diagram illustrating an example of a core network ("CN") node in accordance with some embodiments.

FIG. 37 is a block diagram illustrating elements of a core network ("CN") node 3700 (e.g., an SMF node, an AMF node, an AUSF node, a UDM node, etc.) of a communication network configured to provide cellular communication according to embodiments of inventive concepts. As shown, the CN node 3700 may include network interface circuitry 3707 (also referred to as a network interface) configured to provide communications with other nodes of the core network and/or the RAN. The CN node 3700 may also include a processing circuitry 3703 (also referred to as a processor) coupled to the network interface circuitry, and memory circuitry 3705 (also referred to as memory) coupled to the processing circuitry. The memory circuitry 3705 may include computer readable program code that when executed by the processing circuitry 3703 causes the processing circuitry to perform operations according to embodiments disclosed herein. According to other embodiments, processing circuitry 3703 may be defined to include memory so that a separate memory circuitry is not required.

As discussed herein, operations of the CN node 3700 may be performed by processing circuitry 3703 and/or network interface circuitry 3707. For example, processing circuitry 3703 may control network interface circuitry 3707 to transmit communications through network interface circuitry 3707 to one or more other network nodes and/or to receive communications through network interface circuitry from one or more other network nodes. Moreover, modules may be stored in memory 3705, and these modules may provide instructions so that when instructions of a module are executed by processing circuitry 3703, processing circuitry 3703 performs respective operations.

In some embodiments, a RAN node (e.g., RAN node 3600 of FIG. 36) can be any of a gNB, an eNB, an en-gNB, a ng-eNB, a gNB-centralized unit ("CU"), a gNB-CU-control plane ("CP"), an eNB-CU, or an eNB-CU-CP. In additional or alternative embodiments, a communication device (e.g., communication device 3500 of FIG. 35) or terminal equipment can support any of an E-UTRAN, a NR, or a MR-DC (e.g. such as EN-DC, NE-DC, or NR-DC).

In additional or alternative embodiments, a second RAN node receives, from a communication device, a measurement report associated with events configured at the communication device. In some examples, the event includes a neighbor SSB becoming a threshold amount of offset better than a serving CSI-RS. In additional or alternative examples, the event includes a neighbor SSB becoming an offset1 better than a serving CSI-RS and the neighbor SSB becoming an offset2 better than a serving SSB.

In additional or alternative embodiments, the second RAN node transmits information associated with the received events to a first RAN node. The information can include the radio measurements (e.g., RSRP, reference signal received quality ("RSRQ"), and RSSI) associated with the events. In some examples, the second RAN node may decide to transmit the events and/or associated measurements independently or following a request of another RAN node, which can include the first RAN node towards which the events are to be sent or a third RAN node. In additional or alternative examples, the second RAN node may have received the events and associated measurements from a third RAN node and decide (or be requested) to forward such events and associated measurement to the first RAN node.

In additional or alternative embodiments, the second RAN node transmits the events and/or related measurements according to different patterns, such as: at predefined or configured intervals, on-demand, in batches, or periodically. The sending may be started, stopped, paused, or resumed. The sending interval may be fixed or adjusted (e.g., to use different periodicity).

In additional or alternative embodiments, the second RAN node may receive the indication from the first RAN node that the capacity and coverage optimization ("CCO") issues have been solved.

In additional or alternative embodiments, the second RAN node may receive the indication from the first RAN node that the collection of further events and related measurements are required, for example, with the indication of the event type, the measurement objects to measures (which SSB and CSI-RS beams), and the event configuration parameters.

In some embodiments, the first RAN node can identify and/or classify CCO issues based on the event information received from the second RAN node and/or event information received from a communication device.

In some examples, the first RAN node may receive event information indicating that a serving CSI-RS becomes worse than a first threshold and neighbor SSB becomes better than a second threshold. If this event is signaled between RAN nodes it may help to detect coverage overlaps, coverage holes, capacity issues, and interference situations between neighboring nodes. For example, if the event is signaled to a neighbor node where event information indicates that serving CSI-RS becomes worse than the first threshold and a serving SSB becomes better than the second threshold is recorded, this could highlight a situation where there is a coverage hole concerning CSI-RS signals, while there is an overlap between SSB signals between neighboring cells. This may cause failures due to poor coverage and interference due to extended overlap between neighbor cells.

In additional or alternative examples, the first RAN node may receive event information indicating that serving SSB becomes worse than threshold and a serving CSI-RS becomes offset better than Serving SSB. If this event is signaled between RAN nodes it may help the detection of coverage overlap, coverage holes, capacity issues, and interference situations between neighboring nodes. For example, if this event occurrence is signaled to a neighbor node that, via UE serving and neighbor cell measurements determined that the SSB RS coverage between its cells and neighbor cells is optimal, it is possible for the node receiving the signaling to determine whether a possible interference issue is caused by the event flagged. In another example, the event is signaled to a neighbor node where event information indicates that serving CSI-RS becomes worse than a first threshold and a serving SSB becomes better than a second threshold is recorded, this could highlight a situation where there is a coverage imbalance between SSB and CSI RS of neighbor cells and where there might be the need to re-shape SSB and/or CSI-RS beams in order to have an equivalent coverage within the same cell for SSB RS and CSIRS. A similar deduction can be made when event information indicates that a serving SSB becomes worse than a first threshold and serving CSI-RS becomes better than a second threshold.

In additional or alternative examples, the second RAN node may receive event information indicating that a neighbor SSB becomes an amount of offset better than a serving CSI-RS. If this event is signaled between RAN nodes it may help the detection of coverage overlap, coverage holes and interference situations between neighboring nodes. For example, if the event is signaled to a neighbor node where event information indicates that serving CSI-RS becomes worse than a first threshold and a serving SSB becomes better than a second threshold is recorded, this could highlight a situation where there is a coverage imbalance between SSB and CSI RS of neighbor cells and where there might be the need to re-shape SSB and/or CSI-RS beams in order to have an equivalent coverage within the same cell for SSB RS and CSI RS.

In additional or alternative examples, the second RAN node may receive event information indicating that a neighbor SSB becomes a first offset better than a serving CSI-RS and neighbor SSB becomes a second offset better than a serving SSB. If this event is signaled between RAN nodes it may help the detection of coverage overlap, coverage holes and interference or capacity issues situations between neighboring nodes. For example, if the event is signaled to the neighbor node where the neighbor SSB is served and if the cell hosting the neighbor SSB monitors event information indicating that its serving SSB signals are offset better than its serving CSI-RS signals, the event signaled may reveal that there is a mismatch in SSB and CSI-RS coverage in both neighboring cells. One possible action to correct this effect would be to bring SSB and CSI-RS coverage to the same level in each cell, while ensuring that there are no coverage holes or major overlapping areas between cells.

In additional or alternative examples, the first RAN node may receive event information indicating that the serving CSI-RS becomes an offset better than neighbor SSB. If this event is signaled between RAN nodes it may help the detection of coverage overlap, coverage holes and interference or capacity issues situations between neighboring nodes. For example, reception of this event may signify that data channel coverage for a UE is stretching into the SSB area coverage of a neighboring node's cell. If the data channel coverage of the neighbor node's cell is equivalent to the neighbor node's cell SSB coverage, such event may be used to deduce that strong cross cell interference is affecting the neighbor node. Therefore, the neighbor node may deduce that, in order to avoid such cross cell interference, either the node where the serving CSI-RS is becoming an offset better than the neighbor SSB needs to reduce the coverage of its CSI-RS beams, or that the two neighboring nodes coordinate the user plane resources on which UE are transmitting, avoiding possible overlaps In additional or alternative examples, the first RAN node may receive event information indicating that a serving SSB becomes offset better than serving CSI-RS. If this event is signaled between RAN nodes it may help the detection of coverage overlap, coverage holes and interference or capacity issues situations between neighboring nodes. For example, the reception of this event may be used to deduce that the node monitoring the event is not able to match its SSB RS coverage with its data channel coverage, namely there is a coverage disparity between SSB RS and CSI RS. If the occurrence of this event is signaled to a neighboring node and if, for example, the neighboring node is recording that a serving CSI-RS becomes offset better than neighbor SSB, this might imply that a mobility based on SSB RS, from the neighboring node to the node where the Event was monitored, may result in poor data channel performance after mobility. This is because, after mobility, a user may be located in an area of the target cell where the RS used for Radio Link monitoring is good and the data channel coverage is poor.

In additional or alternative embodiments, the first RAN node may request that the second RAN node transmit events and related radio measurements (such as RSRP, RSRQ, RSSI) for SSB and CSI-RS beams defined in the first network node. In additional or alternative embodiments, the first RAN node receives from the second RAN node the events and associated radio measurements (such as RSRP, RSRQ, RSSI). In additional or alternative embodiments, the first RAN node may send the indication to the second RAN node to collect further events and related measurements as indicated in the operations performed at the second RAN node.

Operations of a first network node will now be discussed with reference to the flow charts of FIGS. 38-39 according to some embodiments of inventive concepts. FIGS. 38-39 will be described below as being performed by network node 3600 (implemented using the structure of the block diagram of FIG. 36). For example, modules may be stored in memory 3605 of FIG. 36, and these modules may provide instructions so that when the instructions of a module are executed by respective processing circuitry 3603, processing circuitry 3603 performs respective operations of the flow charts. However, the operations in FIGS. 38-39 may be performed by any suitable network node.

FIG. 38 illustrates an example of operations performed by a first network node to information associated with an event at a neighbor network node to more accurately determine network issues.

At block 3810, processing circuitry 3603 transmits, via transceiver 3601, a measurement transfer request message to a second network node. The measurement transfer request message can request that the second network node monitor the events and report the information associated with the events to the first network node.

At block 3820, processing circuitry 3603 receives, via transceiver 3601, a measurement transfer response message from the second network node. The measurement transfer response message can indicate that the second network node is configured to monitor the events and report the information associated with the events to the first network node.

At block 3830, processing circuitry 3603 receives, via transceiver 3601, a message from the second network node. The message can include information associated with an event related to channel measurements. In some embodiments, the message is a measurement transfer update message. In additional or alternative embodiments, the event is related to channel measurements associated with a neighbor node that is different than the first network node. In additional or alternative embodiments, the neighbor network node is different than the second network node. In additional or alternative embodiments, the neighbor network node is the same as the second network node.

In some embodiments, the information indicates a type of the event detected by the neighbor network node.

In additional or alternative embodiments, the event is related to beam measurements collected by a communication device operating in the communications network. The beam measurements collected by the communication device can be measurements on at least one of: synchronization signal block ("SSB") beams; channel status indicator reference signal ("CSI-RS") beams; and a tracking reference signal ("TRS"). In additional or alternative embodiments, the communication device may be within a coverage area (or within a predetermined distance of the coverage area) of the first network node.

At block 3840, processing circuitry 3603 determines a network issue associated with the communications network based on the information. In some embodiments, the network issue includes a capacity and coverage optimization ("CCO") issue associated with the first network node and/or the neighbor network node.

In some embodiments, the message is a first message, the information is first information, and the neighbor network node is a first neighbor network node. In additional or alternative embodiments, determining the network issue can further include receiving a second message from a fourth network node. The second message can include second information associated with events related to channel measurements that were determined by a second neighbor network node. In additional or alternative embodiments, processing circuitry 3603 determines the network issue based on the first information and the second information.

In additional or alternative embodiments, determining the network issue further includes receiving beam measurements from a communication device connected to the communications network via the first network node. In additional or alternative embodiments, processing circuitry 3603 determines the network issue based on the first information and the beam measurements from the communication device.

In additional or alternative embodiments, determining the network issue includes detecting at least one of coverage overlaps, coverage holes, capacity issues, and interference between the first network node and the second network node.

FIG. 39 illustrates an example of additional operations performed by the first network node in response to determining the network issues. At block 3910, processing circuitry 3603 performs an action based on the network issue. At block 3920, processing circuitry 3603 transmits, via transceiver 3601, a notification of the action to the second network node.

Various operations of FIGS. 38-39 may be optional with respect to some embodiments of communication devices and related methods. For example, regarding the method of Example Embodiment 1 below, for example, operations of blocks 3810 and 3820 of FIG. 38 and blocks 3910 and 3920 of FIG. 39 may be optional.

Example Embodiments are included below.

Embodiment 1. A method of operating a first network node operating in a communications network that includes a second network node, the method comprising:

receiving (3830) a message from the second network node, the message including information associated with an event detected by a neighbor network node that is different than the first network node, the event being related to channel measurements associated with the neighbor network node operating in the communications network; and determining (3840) a network issue associated with the communications network based on the information.

Embodiment 2. The method of Embodiment 1, wherein the network issue comprises a capacity and coverage optimization, CCO, issue associated with the first network node and/or the neighbor network node.

Embodiment 3. The method of any of Embodiments 1-2, wherein the neighbor network node is the second network node, and wherein the information comprises an indication of a type of the event detected by the second network node.

Embodiment 4. The method of any of Embodiments 1-3, wherein the event is related to beam measurements collected by a communication device operating in the communications network, and wherein the beam measurements collected by the communication device are measurements on at least one of: synchronization signal block, SSB, beams; channel status indicator reference signal, CSI-RS, beams; and a tracking reference signal.

Embodiment 5. The method of Embodiment 4, wherein the communication device is within a coverage area of the first network node.

Embodiment 6. The method of Embodiment 4, wherein the communication device is outside of a coverage area of the first network node.

Embodiment 7. The method of any of Embodiments 1-6, wherein the message is a first message, wherein the information is first information, wherein the neighbor network node is a first neighbor network node, and

wherein determining the network issue further comprises:

receiving a second message from a fourth network node, the second message including second information associated with events related to channel measurements that were determined by a second neighbor network node; and determining the network issue based on the first information and the second information.

Embodiment 8. The method of any of Embodiments 1-7, wherein the message is a first message, wherein the information is first information, wherein determining the network issue further comprises:

receiving beam measurements from a communication device connected to the communications network via the first network node; and determining the network issue based on the first information and the beam measurements from the communication device.

Embodiment 9. The method of any of Embodiments 1-8, wherein the message is a measurement transfer update message, the method further comprising:

transmitting (3810) a measurement transfer request message to the second network node, the measurement transfer request message requesting the second network node to monitor the events and to report the information associated with the events to the first network node; and receiving (3820) a measurement transfer response message from the second network node, the measurement transfer response message indicating that the second network node is configured to monitor the events and report the information associated with the events to the first network node.

Embodiment 10. The method of any of Embodiments 1-9, wherein determining the network issue comprises detecting at least one of coverage overlaps, coverage holes, capacity issues, and interference between the first network node and the second network node.

Embodiment 11. The method of any of Embodiments 1-10, wherein the event indicates that a serving channel status indicator-reference signal, CSI-RS, is worse than a first threshold value and that a neighbor synchronization signal block, SSB, is better than a second threshold value, and wherein determining the network issue comprises determining that there is a coverage hole associated with CSI-RSs and an overlap between SSB signals between neighboring cells based on the event.

Embodiment 12. The method of any of Embodiments 1-10, wherein the event indicates that a serving synchronization signal block, SSB, is worse than a first threshold value and that a serving channel status indicator-reference signal, CSI-RS, is an amount better than the serving SSB, and wherein determining the network issue comprises determining that an interference issue is caused by the event.

Embodiment 13. The method of Embodiment 12, wherein the event is a first event, and wherein determining the network issue further comprises:

determining a second event associated with the first network node, the second event indicating that a serving CSI-RS is worse than a third threshold value and that a serving SSB is better than a fourth threshold value; and determining that there is a coverage imbalance between SSB and CSI-RS of the first network node and the second network node based on the first event and the second event.

Embodiment 14. The method of any of Embodiments 1-10, wherein the event is a first event and indicates that a neighbor synchronization signal block, SSB, is an amount better than a serving channel status indicator-reference signal, CSI-RS, and wherein determining the network issue further comprises:

determining a second event associated with the first network node, the second event indicating that a serving CSI-RS is worse than a third threshold value and that a serving SSB is better than a fourth threshold value; and determining that there is a coverage imbalance between SSB and CSI-RS of the first network node and the second network node based on the first event and the second event.

Embodiment 15. The method of any of Embodiments 1-10, wherein the event is a first event and indicates that a neighbor serving synchronization signal block, SSB, of the second network node is a first amount better than a serving channel status indicator-reference signal, CSI-RS, of the second network node and that the neighbor SSB is a second amount better than a serving SSB of the second network node, and wherein determining the network issue comprises:

determining a second event associated with the first network node, the second event indicating that CSI-RS signals of the first network node are lower than its SSB signals; and determining that there is mismatch in SSB and CSI-RS coverage in both neighboring cells based on the first event and the second event.

Embodiment 16. The method of any of Embodiments 1-10, wherein the event indicates that a serving channel status indicator-reference signal, CSI-RS, is an amount better than a neighbor synchronization signal block, SSB, and wherein determining the network issue comprises determining that data channel coverage for the communication device is stretching into a SSB area coverage of the first network node.

Embodiment 17. The method of any of Embodiments 1-16, further comprising:

responsive to determining the network issue, performing (3910) an action based on the network issue; and transmitting (3920) a notification of the action to the second network node.

Embodiment 18. The method of any of Embodiments 1-17, wherein the communications network is a new radio, NR, network, wherein the first network node is a first radio access network, RAN, node, and wherein the second network node is a second RAN node.

Embodiment 19. A first network node (1400) operating in a communications network that includes a second network node, the first network node comprising:

processing circuitry (3603); and memory (3605) coupled with the processing circuitry, wherein the memory includes instructions that when executed by the processing circuitry causes the first network node to perform operations, the operations comprising:

receiving (3830) a message from the second network node, the message including information associated with an event detected by a neighbor network node that is different than the first network node, the event being related to channel measurements associated with the neighbor network node operating in the communications network; and determining (3840) a network issue associated with the communications network based on the information.

Embodiment 20. The first network node of Embodiment 19, wherein the network issue comprises a capacity and coverage optimization, CCO, issue associated with the first network node and/or the neighbor network node.

Embodiment 21. The first network node of any of Embodiments 18-19, wherein the neighbor network node is the second network node, and wherein the information comprises an indication of a type of the event detected by the second network node.

Embodiment 22. The first network node of any of Embodiments 19-21, wherein the event is related to beam measurements collected by a communication device operating in the communications network, and wherein the beam measurements collected by the communication device are measurements on at least one of: synchronization signal block, SSB, beams; channel status indicator reference signal, CSI-RS, beams; and a tracking reference signal.

Embodiment 23. The first network node of Embodiment 22, wherein the communication device is within a coverage area of the first network node.

Embodiment 24. The first network node of Embodiment 22, wherein the communication device is outside a coverage area of the first network node.

Embodiment 25. The first network node of any of Embodiments 19-24, wherein the message is a first message, wherein the information is first information wherein the neighbor network node is a first neighbor network node, and wherein determining the network issue further comprises:

receiving a second message from a fourth network node, the second message including second information associated with events related to channel measurements that were determined by a second neighbor network node; and determining the network issue based on the first information and the second information.

Embodiment 26. The first network node of any of Embodiments 19-25, wherein the message is a first message, wherein the information is first information, wherein determining the network issue further comprises:

receiving beam measurements from a communication device connected to the communications network via the first network node; and determining the network issue based on the first information and the beam measurements from the communication device.

Embodiment 27. The first network node of any of Embodiments 19-26, wherein the message is a measurement transfer update message, the operations further comprising:

transmitting (3810) a measurement transfer request message to the second network node, the measurement transfer request message requesting the second network node to monitor the events and to report the information associated with the events to the first network node; and receiving (3820) a measurement transfer response message from the second network node, the measurement transfer response message indicating that the second network node is configured to monitor the events and report the information associated with the events to the first network node.

Embodiment 28. The first network node of any of Embodiments 19-27, wherein determining the network issue comprises detecting at least one of coverage overlaps, coverage holes, capacity issues, and interference between the first network node and the second network node.

Embodiment 29. The first network node of any of Embodiments 19-28, wherein the event indicates that a serving channel status indicator-reference signal, CSI-RS, is worse than a first threshold value and that a neighbor synchronization signal block, SSB, is better than a second threshold value, and wherein determining the network issue comprises determining that there is a coverage hole associated with CSI-RSs and an overlap between SSB signals between neighboring cells based on the event.

Embodiment 30. The first network node of any of Embodiments 19-28, wherein the event indicates that a serving synchronization signal block, SSB, is worse than a first threshold value and that a serving channel status indicator-reference signal, CSI-RS, is an amount better than the serving SSB, and wherein determining the network issue comprises determining that an interference issue is caused by the event.

Embodiment 31. The first network node of Embodiment 30, wherein the event is a first event, and wherein determining the network issue further comprises:
determining a second event associated with the first network node, the second event indicating that a serving CSI-RS is worse than a third threshold value and that a serving SSB is better than a fourth threshold value; and
determining that there is a coverage imbalance between SSB and CSI-RS of the first network node and the second network node based on the first event and the second event.

Embodiment 32. The first network node of any of Embodiments 19-28, wherein the event is a first event and indicates that a neighbor synchronization signal block, SSB, is an amount better than a serving channel status indicator-reference signal, CSI-RS, and wherein determining the network issue further comprises:
determining a second event associated with the first network node, the second event indicating that a serving CSI-RS is worse than a third threshold value and that a serving SSB is better than a fourth threshold value; and
determining that there is a coverage imbalance between SSB and CSI-RS of the first network node and the second network node based on the first event and the second event.

Embodiment 33. The first network node of any of Embodiments 19-28, wherein the event is a first event and indicates that a neighbor serving synchronization signal block, SSB, of the second network node is a first amount better than a serving channel status indicator-reference signal, CSI-RS, of the second network node and that the neighbor SSB is a second amount better than a serving SSB of the second network node, and wherein determining the network issue comprises:
determining a second event associated with the first network node, the second event indicating that CSI-RS signals of the first network node are lower than its SSB signals; and determining that there is mismatch in SSB and CSI-RS coverage in both neighboring cells based on the first event and the second event.

Embodiment 34. The first network node of any of Embodiments 19-28, wherein the event indicates that a serving channel status indicator-reference signal, CSI-RS, is an amount better than a neighbor synchronization signal block, SSB, and wherein determining the network issue comprises determining that data channel coverage for the communication device is stretching into a SSB area coverage of the first network node.

Embodiment 35. The first network node of any of Embodiments 19-34, the operations further comprising:
responsive to determining the network issue, performing (3910) an action based on the network issue; and
transmitting (3920) a notification of the action to the second network node.

Embodiment 36. The first network node of any of Embodiments 19-35, wherein the communications network is a new radio, NR, network, wherein the first network node is a first radio access network, RAN, node, and wherein the second network node is a second RAN node.

Embodiment 37. A first network node (3600) operating in a communications network adapted to perform operations, the operations comprising:
receiving (3830) a message from the second network node, the message including information associated with an event detected by a neighbor network node that is different than the first network node, the event being related to channel measurements associated with the neighbor network node operating in the communications network; and
determining (3840) a network issue associated with the communications network based on the information.

Embodiment 38. The first network node of Embodiment 37 further adapted to perform any of the operations of claims 2-18.

Embodiment 39. A computer program comprising program code to be executed by processing circuitry (3603) of a first network node (3600) operating in a communications network that includes a second network node, whereby execution of the program code causes the first network node to perform operations, the operations comprising:
receiving (3830) a message from the second network node, the message including information associated with an event detected by a neighbor network node that is different than the first network node, the event being related to channel measurements associated with the neighbor network node operating in the communications network; and
determining (3840) a network issue associated with the communications network based on the information.

Embodiment 40. The computer program of Embodiment 39, the operations further comprising any of the operations of claims 2-18.

Embodiment 41. A computer program product comprising a non-transitory storage medium including program code to be executed by processing circuitry (3603) of a first network node (3600) operating in a communications network, whereby execution of the program code causes the first network node to perform operations, the operations comprising:
receiving (3830) a message from the second network node, the message including information associated with an event detected by a neighbor network node that is different than the first network node, the event being related to channel measurements associated with the neighbor network node operating in the communications network; and determining (3840) a network issue associated with the communications network based on the information.

Embodiment 42. The computer program product of Embodiment 41, the operations further comprising any of the operations of claims 2-18.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

40 illustrates a wireless network in accordance with some embodiments.

Figure 40:
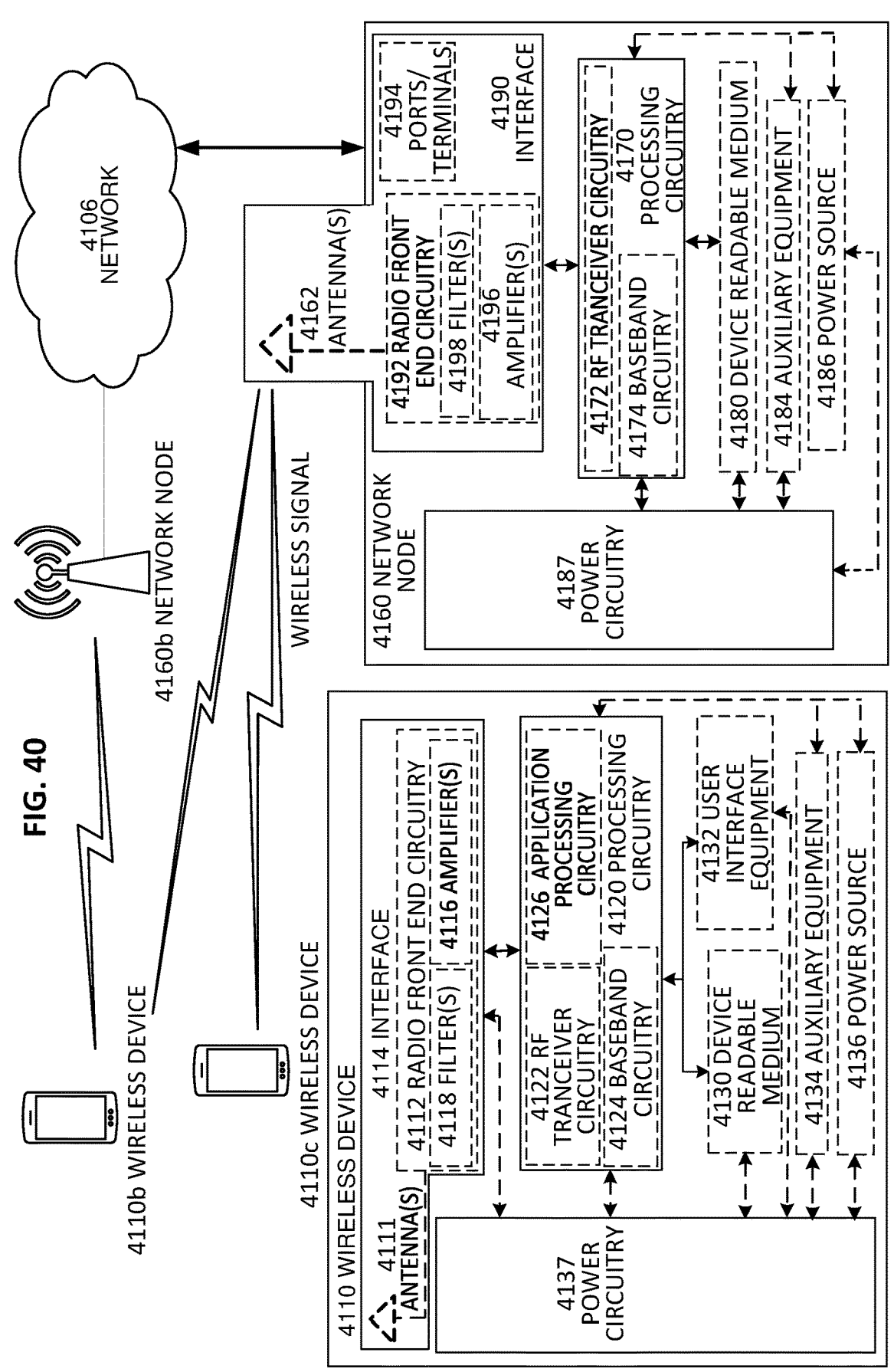
FIG. 40 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 40. For simplicity, the wireless network of FIG. 40 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 40, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 40 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 40 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 41:
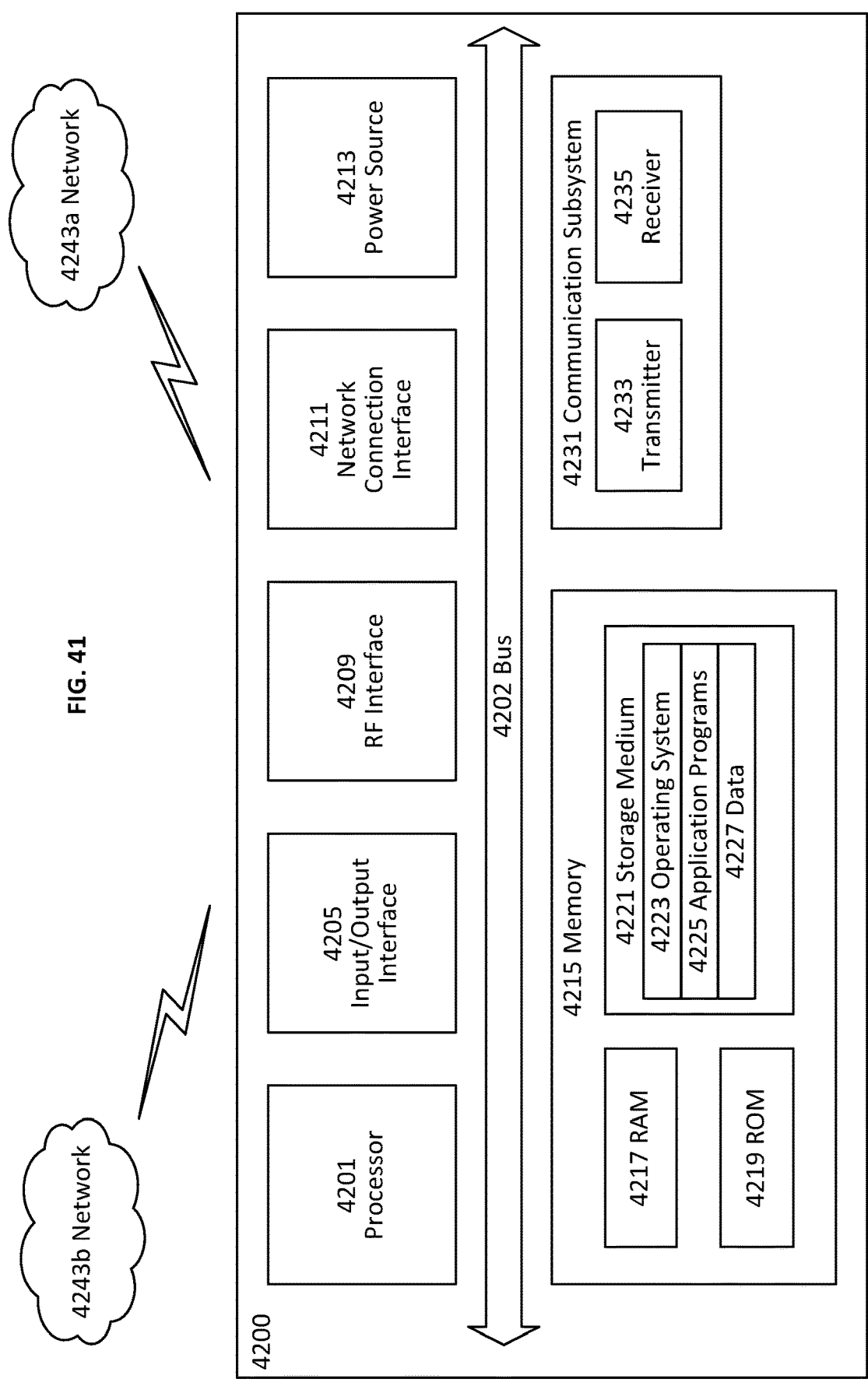
FIG. 41 is a block diagram of a user equipment in accordance with some embodiments.

FIG. 41 illustrates a user Equipment in accordance with some embodiments.

FIG. 41 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 41, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 41 is a UE, the components discussed herein are equally applicable to a WD, and vice-versa.

In FIG. 41, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 41, or only a subset of the components. The level of integration between the components may vary from one UE to another UE. Further, certain UEs may contain multiple instances of a component, such as multiple processors, memories, transceivers, transmitters, receivers, etc.

In FIG. 41, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 41, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 41, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 42:
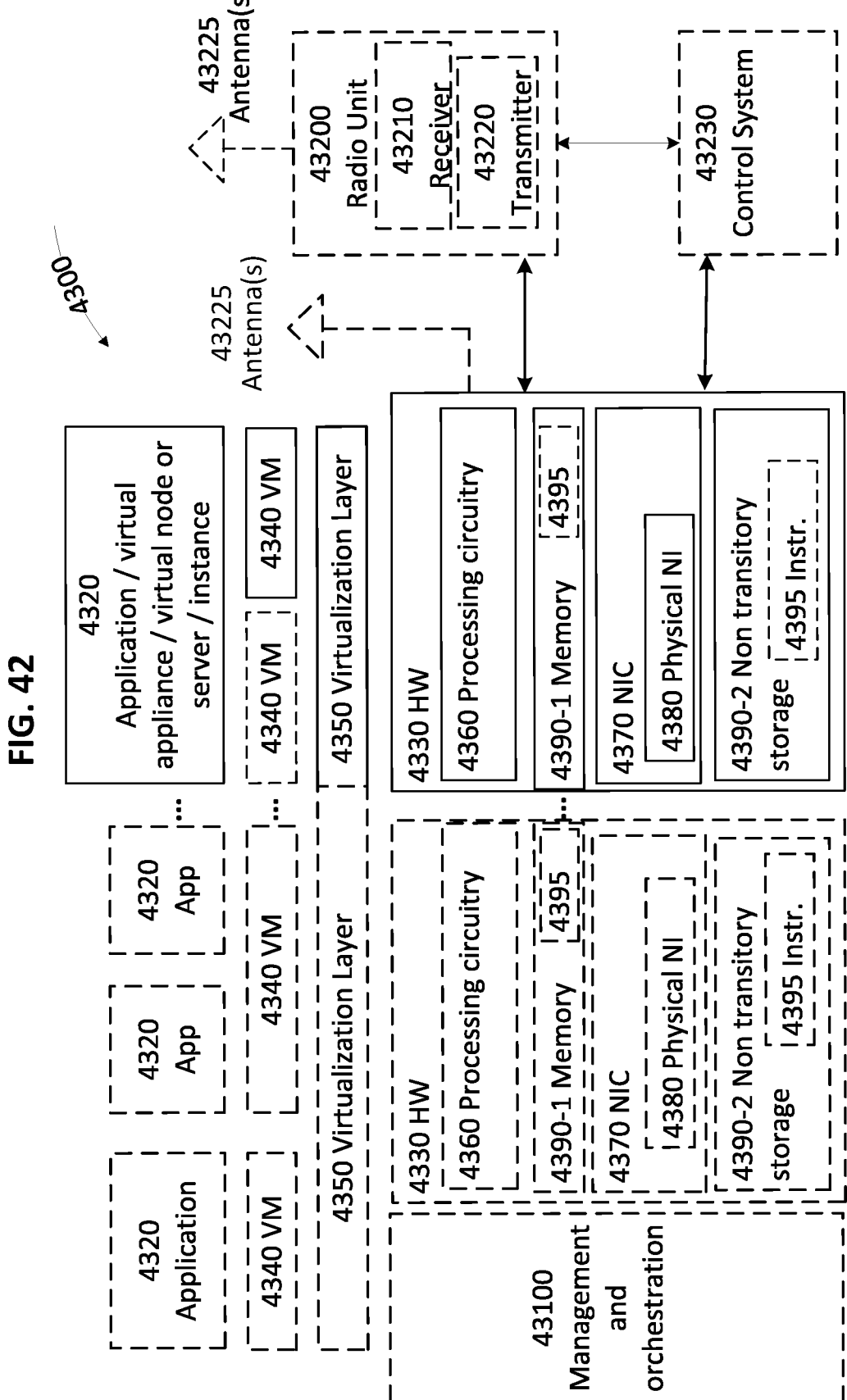
FIG. 42 is a block diagram of a virtualization environment in accordance with some embodiments.

FIG. 42 illustrates a virtualization environment in accordance with some embodiments.

FIG. 42 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 42, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 42.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 43:
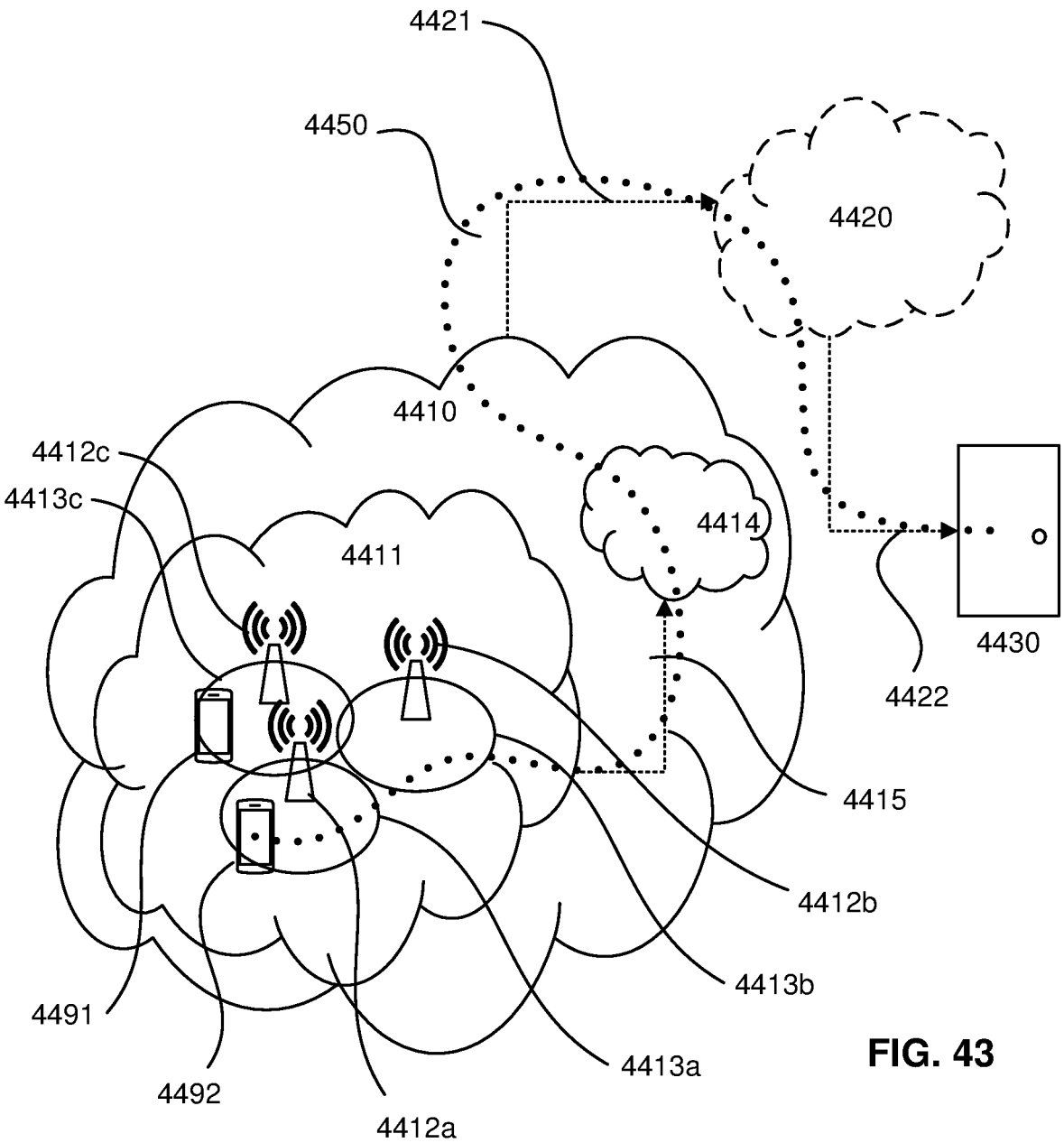
FIG. 43 is a block diagram of a telecommunication network connected via an intermediate network to a host computer in accordance with some embodiments.

FIG. 43 illustrates a telecommunication network connected via an intermediate network to a host computer in accordance with some embodiments.

With reference to FIG. 43, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 43 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 44:
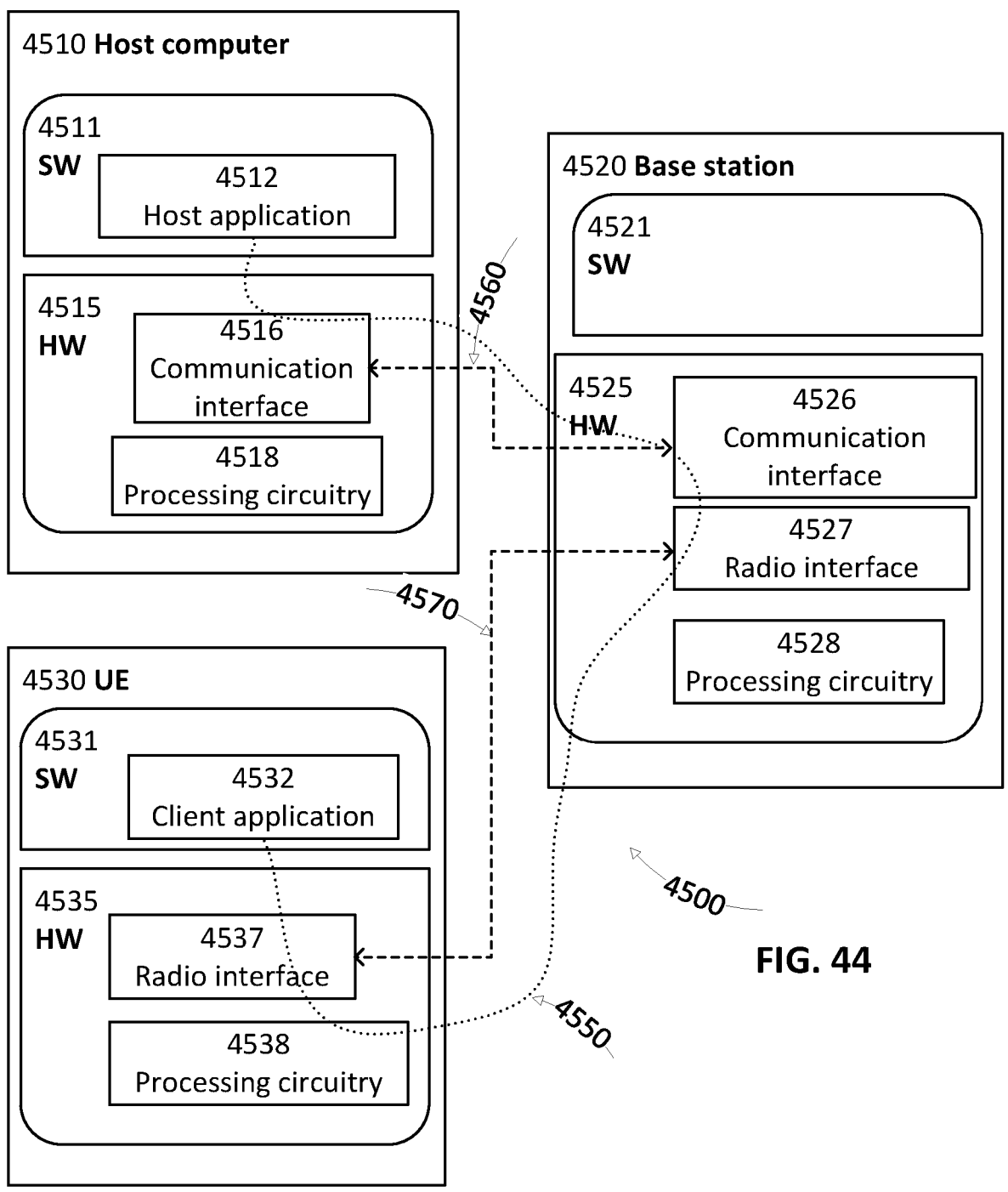
FIG. 44 is a block diagram of a host computer communicating via a base station with a user equipment over a partially wireless connection in accordance with some embodiments.

FIG. 44 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 44. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 44) served by base station 4520. Communication interface 4526 may be configured to facilitate connection 4560 to host computer 4510. Connection 4560 may be direct or it may pass through a core network (not shown in FIG. 44) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 44 may be similar or identical to host computer 4430, one of base stations 4412a, 4412b, 4412c and one of UEs 4491, 4492 of FIG. 43, respectively. This is to say, the inner workings of these entities may be as shown in FIG. 44 and independently, the surrounding network topology may be that of FIG. 43.

In FIG. 44, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 45, 46:
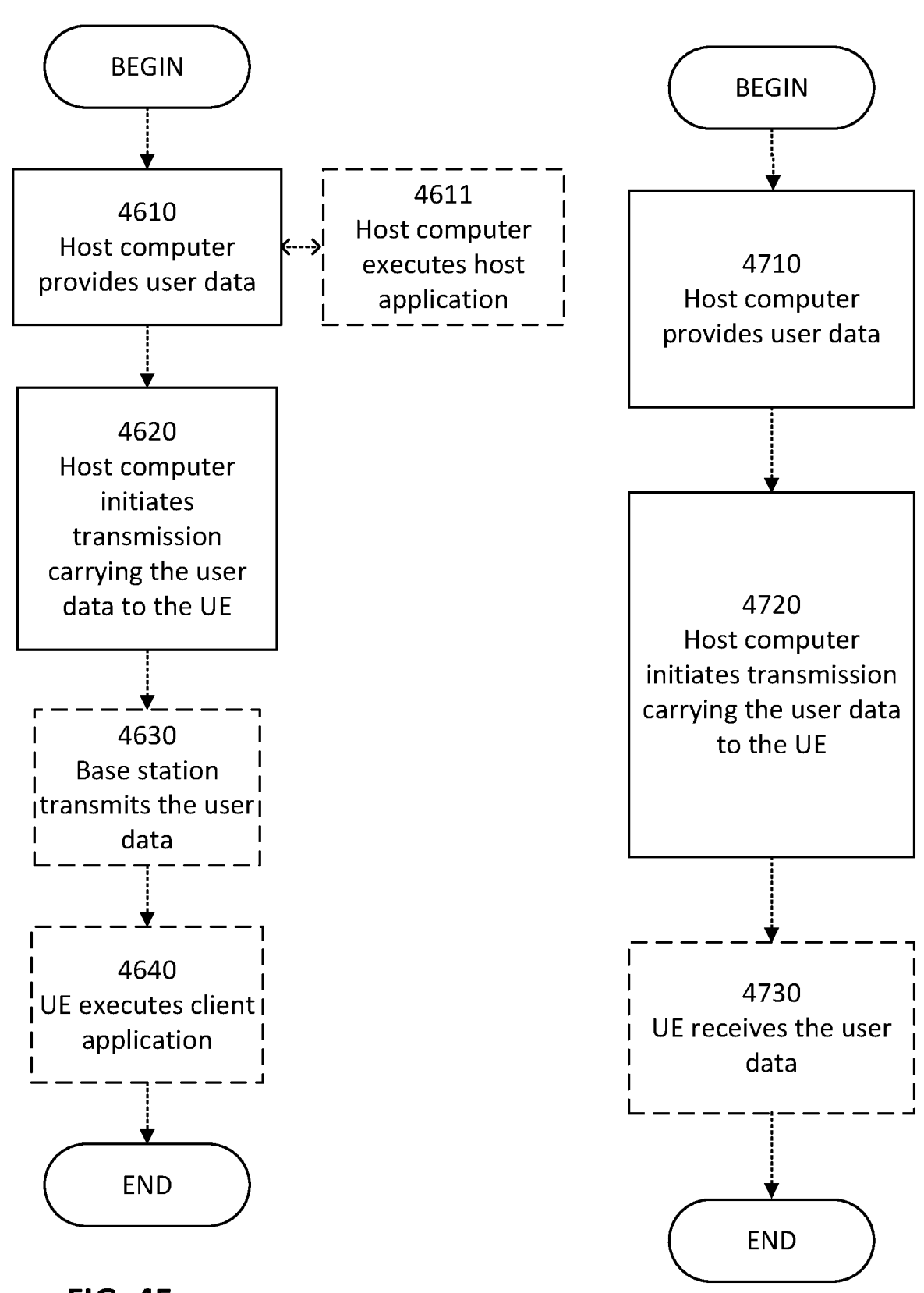
FIG. 45 is a block diagram of methods implemented in a communication system including a host computer, a base station, and a user equipment in accordance with some embodiments.
FIG. 46 is a block diagram of methods implemented in a communication system including a host computer, a base station, and a user equipment in accordance with some embodiments.

FIG. 45 illustrates methods implemented in a communication system including a host computer, a base station and a user equipment in accordance with some embodiments FIG. 45 is a flowchart illustrating a method implemented in a communication system, in accordance with one embodiment. The communication system includes a host computer, a base station and a UE which may be those described with reference to FIGS. 43-44. For simplicity of the present disclosure, only drawing references to FIG. 45 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 46 illustrates methods implemented in a communication system including a host computer, a base station and a user equipment in accordance with some embodiments.

FIG. 46 is a flowchart illustrating a method implemented in a communication system, in accordance with one embodiment. The communication system includes a host computer, a base station and a UE which may be those described with reference to FIGS. 43-44. For simplicity of the present disclosure, only drawing references to FIG. 46 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 47 illustrates methods implemented in a communication system including a host computer, a base station and a user equipment in accordance with some embodiments FIG. 47 is a flowchart illustrating a method implemented in a communication system, in accordance with one embodiment. The communication system includes a host computer, a base station and a UE which may be those described with reference to FIGS. 43-44. For simplicity of the present disclosure, only drawing references to FIG. 47 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 48 illustrates methods implemented in a communication system including a host computer, a base station and a user equipment in accordance with some embodiments FIG. 48 is a flowchart illustrating a method implemented in a communication system, in accordance with one embodiment. The communication system includes a host computer, a base station and a UE which may be those described with reference to FIGS. 43-44. For simplicity of the present disclosure, only drawing references to FIG. 48 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex TDOA Time Difference of Arrival TOA Time of Arrival TSS Tertiary Synchronization Signal TTI Transmission Time Interval UE User Equipment UL Uplink UMTS Universal Mobile Telecommunication System USIM Universal Subscriber Identity Module UTDOA Uplink Time Difference of Arrival UTRA Universal Terrestrial Radio Access UTRAN Universal Terrestrial Radio Access Network WCDMA Wide CDMA WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first network node operating in a communications network that includes a second network node, the method comprising:

receiving a message from the second network node, the message including information associated with an event detected by a neighbor network node that is different than the first network node, the event being related to channel measurements associated with the neighbor network node operating in the communications network, wherein the event is related to beam measurements collected by a communication device operating in the communications network, and wherein the beam measurements collected by the communication device are measurements on at least one of: synchronization signal block (SSB) beams; channel status indicator reference signal (CSI-RS) beams; or a tracking reference signal; and determining a network issue associated with the communications network based on the information, wherein the message is a first message, wherein the information is first information, wherein determining the network issue further comprises:

receiving beam measurements from the communication device connected to the communications network via the first network node; and determining the network issue based on the first information and the beam measurements from the communication device.

2. The method of claim 1, wherein the network issue comprises a capacity and coverage optimization (CCO) issue associated with the first network node and/or the neighbor network node.

3. The method of claim 1, wherein the neighbor network node is the second network node, and wherein the information comprises an indication of a type of the event detected by the second network node.

4. The method of claim 1, wherein the communication device is within a coverage area of the first network node.

5. The method of claim 1, wherein the communication device is outside of a coverage area of the first network node.

6. The method of claim 1, wherein the neighbor network node is a first neighbor network node, and wherein determining the network issue further comprises:

receiving a second message from a fourth network node, the second message including second information associated with events related to channel measurements that were determined by a second neighbor network node; and determining the network issue based on the first information and the second information.

7. The method of claim 1, wherein the message is a measurement transfer update message, the method further comprising:

transmitting a measurement transfer request message to the second network node, the measurement transfer request message requesting the second network node to monitor events and to report the information associated with the events to the first network node; and receiving a measurement transfer response message from the second network node, the measurement transfer response message indicating that the second network node is configured to monitor the events and report the information associated with the events to the first network node.

8. The method of claim 1, wherein determining the network issue comprises detecting at least one of coverage overlaps, coverage holes, capacity issues, and interference between the first network node and the second network node.

9. The method of claim 1, wherein the event indicates that a serving channel status indicator-reference signal (CSI-RS) is worse than a first threshold value and that a neighbor synchronization signal block (SSB) is better than a second threshold value, and wherein determining the network issue comprises determining that there is a coverage hole associated with CSI-RSs and an overlap between SSB signals between neighboring cells based on the event.

10. The method of claim 1, wherein the event indicates that a serving synchronization signal block (SSB) is worse than a first threshold value and that a serving channel status indicator-reference signal (CSI-RS) is an amount better than the serving SSB, and wherein determining the network issue comprises determining that an interference issue is caused by the event.

11. The method of claim 10, wherein the event is a first event, and wherein determining the network issue further comprises:

determining a second event associated with the first network node, the second event indicating that a serving CSI-RS is worse than a third threshold value and that a serving SSB is better than a fourth threshold value; and determining that there is a coverage imbalance between SSB and CSI-RS of the first network node and the second network node based on the first event and the second event.

12. The method of claim 1, wherein the event is a first event and indicates that a neighbor synchronization signal block (SSB) is an amount better than a serving channel status indicator-reference signal (CSI-RS) and wherein determining the network issue further comprises:

determining a second event associated with the first network node, the second event indicating that a serving CSI-RS is worse than a third threshold value and that a serving SSB is better than a fourth threshold value; and determining that there is a coverage imbalance between SSB and CSI-RS of the first network node and the second network node based on the first event and the second event.

13. The method of claim 1, wherein the event is a first event and indicates that a neighbor serving synchronization signal block (SSB) of the second network node is a first amount better than a serving channel status indicator-reference signal (CSI-RS) of the second network node and that the neighbor SSB is a second amount better than a serving SSB of the second network node, and wherein determining the network issue comprises:

determining a second event associated with the first network node, the second event indicating that CSI-RS signals of the first network node are lower than its SSB signals; and determining that there is mismatch in SSB and CSI-RS coverage in both neighboring cells based on the first event and the second event.

14. The method of claim 1, wherein the event indicates that a serving channel status indicator-reference signal (CSI-RS) is an amount better than a neighbor synchronization signal block (SSB) and wherein determining the network issue comprises determining that data channel coverage for the communication device is stretching into an SSB area coverage of the first network node.

15. The method of claim 1, further comprising:

responsive to determining the network issue, performing an action based on the network issue; and transmitting a notification of the action to the second network node.

16. The method of claim 1, wherein the communications network is a new radio (NR) network, wherein the first network node is a first radio access network (RAN) node, and wherein the second network node is a second RAN node.

17. A first network node operating in a communications network that includes a second network node, the first network node comprising:

processing circuitry; and memory coupled with the processing circuitry, wherein the memory includes instructions that when executed by the processing circuitry causes the first network node to perform operations, the operations comprising:

receiving a message from the second network node, the message including information associated with an event detected by a neighbor network node that is different than the first network node, the event being related to channel measurements associated with the neighbor network node operating in the communications network, wherein the event is related to beam measurements collected by a communication device operating in the communications network, and wherein the beam measurements collected by the communication device are measurements on at least one of: synchronization signal block (SSB) beams; channel status indicator reference signal (CSI-RS) beams; or a tracking reference signal; and determining a network issue associated with the communications network based on the information, wherein the message is a first message, wherein the information is first information, wherein determining the network issue further comprises:

receiving beam measurements from the communication device connected to the communications network via the first network node; and determining the network issue based on the first information and the beam measurements from the communication device.

18. The first network node of claim 17, wherein the network issue comprises a capacity and coverage optimization (CCO) issue associated with the first network node and/or the neighbor network node.

*   *   *   *   *